(12) United States Patent
Kosugi

(10) Patent No.: US 12,148,243 B2
(45) Date of Patent: Nov. 19, 2024

(54) ELECTRONIC APPARATUS AND CONTROL METHOD

(71) Applicant: Lenovo (Singapore) Pte. Ltd., Singapore (SG)

(72) Inventor: Kazuhiro Kosugi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 389 days.

(21) Appl. No.: 17/699,519

(22) Filed: Mar. 21, 2022

(65) Prior Publication Data

US 2022/0366722 A1 Nov. 17, 2022

(30) Foreign Application Priority Data

May 12, 2021 (JP) ................................. 2021-080887

(51) Int. Cl.
*G06V 40/16* (2022.01)
*G06T 1/00* (2006.01)
*G06T 7/20* (2017.01)

(52) U.S. Cl.
CPC .......... *G06V 40/167* (2022.01); *G06T 1/0007* (2013.01); *G06T 7/20* (2013.01); *G06T 2200/28* (2013.01); *G06T 2207/30201* (2013.01)

(58) Field of Classification Search
CPC ....... G06V 40/167; G06T 1/0007; G06T 7/20; G06T 2200/28; G06T 2207/30201
See application file for complete search history.

(56) References Cited

U.S. PATENT DOCUMENTS

| | | | | |
|---|---|---|---|---|
| 10,268,911 | B1* | 4/2019 | Wu | G06V 40/171 |
| 11,900,706 | B1* | 2/2024 | Qian | G06T 7/20 |
| 2007/0061851 | A1* | 3/2007 | Deshpande | A63F 13/00 |
| | | | | 725/102 |
| 2017/0351908 | A1* | 12/2017 | Wang | H04N 23/611 |
| 2018/0165437 | A1* | 6/2018 | Shim | G06V 40/20 |
| 2019/0213309 | A1* | 7/2019 | Morestin | G01S 17/04 |

(Continued)

FOREIGN PATENT DOCUMENTS

| | | |
|---|---|---|
| JP | 2008-009849 A | 1/2008 |
| JP | 2012-028947 A | 2/2012 |

(Continued)

*Primary Examiner* — Utpal D Shah
(74) *Attorney, Agent, or Firm* — Osha Bergman Watanabe & Burton LLP

(57) ABSTRACT

An electronic apparatus includes a memory which temporarily stores image data of an image captured by an imaging device, and a processor which processes image data stored in the memory. The processor processes image data of plural images captured by the imaging device at predetermined time intervals and stored in the memory, detects face areas with faces captured therein from among the plural images based on first-resolution image data and second-resolution image data, and determines whether or not the face areas are consecutively detected from the plural images. Further, when determining that the state is changed between a state where face areas are consecutively detected and a state where face areas are not consecutively detected while performing processing to detect the face areas based on first-resolution image data, the processor detects face areas from among the plural images based on the second-resolution image data.

11 Claims, 14 Drawing Sheets

(56) References Cited

U.S. PATENT DOCUMENTS

| | | | | |
|---|---|---|---|---|
| 2020/0105013 A1* | 4/2020 | Chen | .................... | G06V 40/166 |
| 2020/0151852 A1* | 5/2020 | Wang | .................... | G06T 3/4053 |
| 2022/0139199 A1* | 5/2022 | Miwa | ................... | G08B 21/182 |
| | | | | 340/573.1 |
| 2023/0196836 A1* | 6/2023 | Malpani | ............... | G06V 40/172 |
| | | | | 382/103 |
| 2023/0230294 A1* | 7/2023 | Nagai | .................... | H04N 7/188 |
| 2024/0004438 A1* | 1/2024 | Holz | ........................ | G02B 5/04 |

FOREIGN PATENT DOCUMENTS

| | | |
|---|---|---|
| JP | 2013-179614 A | 9/2013 |
| JP | 2016-148895 A | 8/2016 |
| WO | 2021029152 A1 | 2/2021 |

* cited by examiner

ELECTRONIC APPARATUS AND CONTROL METHOD

CROSS-REFERENCE TO RELATED APPLICATIONS

This application claims priority to Japanese Patent Application No. 2021-80887 filed May 12, 2021, the contents of which are hereby incorporated herein by reference in their entirety.

TECHNICAL FIELD

The present invention relates to an electronic apparatus and a control method.

BACKGROUND

There is an electronic apparatus which makes a transition to a usable state when a person approaches or to a standby state in which functions except some of the functions are stopped when the person leaves. For example, in Japanese Unexamined Patent Application Publication No. 2016-148895, an infrared sensor is used to detect whether a person is approaching or a person goes away.

In recent years, with the development of computer vision and the like, detection accuracy when detecting a face from an image has been getting higher. Therefore, face detection is beginning to be used instead of person detection using the infrared sensor. When using the infrared sensor, infrared light is reflected on and returned from a target regardless of whether the target is a person or any object other than the person, but the use of face detection can prevent just an object from being detected as a person by mistake.

SUMMARY

However, it may be difficult to detect a face depending on the face orientation or the like, and face detection may become unstable, such as that no face is detected even when a person is present. For example, when a user is using a second display connected to an electronic apparatus, a side profile of the user may be detected on the side of the electronic apparatus. In such a case, face detection may become unstable and it might be erroneously detected that the user is absent despite the presence of the user using the electronic apparatus.

One or more embodiments of the present invention provide an electronic apparatus and a control method for detecting a person using the electronic apparatus accurately.

An electronic apparatus, according to one or more embodiments of the present invention, includes: a memory which temporarily stores image data of an image captured by an imaging device; and a processor which processes image data stored in the memory, the processor including: a face detection unit which processes image data of a plurality of images captured by the imaging device at predetermined time intervals and stored in the memory to detect face areas with faces captured therein from among the plurality of images based on first-resolution image data and second-resolution image data; and a detection state determination unit which determines whether or not the face areas are consecutively detected from the plurality of images, wherein when the detection state determination unit determines, based on the first-resolution image data, that a state is changed between a state where the face areas are consecutively detected and a state where the face areas are not consecutively detected while performing processing to detect the face areas, the face detection unit detects the face areas from the plurality of images based on the second-resolution image data.

The above electronic apparatus may also be such that the detection state determination unit determines that the state is the state where the face areas are not consecutively detected based on the fact that images with face areas detected by the face detection unit and images without detected face areas are both included at a predetermined ratio in the plurality of images captured at the predetermined time intervals over a predetermined period.

The above electronic apparatus may further be such that the first resolution is a resolution lower than the second resolution, and when the detection state determination unit determines that the state is changed from the state where the face areas are consecutively detected to the state where the face areas are not consecutively detected while performing processing to detect the face areas in a low-resolution mode based on the first-resolution image data, the face detection unit executes processing in a high-resolution mode to perform detection of the face areas based on the second-resolution image data in specific areas corresponding to the positions of the face areas detected in the processing of the low-resolution mode.

Further, the above electronic apparatus may be such that, when the face areas cannot be detected from the specific areas in the high-resolution mode, the face detection unit executes the detection of the face areas in the low-resolution mode.

Further, the above electronic apparatus may be such that a detection range when the face detection unit detects the face areas from the plurality of images is set to a range smaller than a range of image areas of the captured images, and the electronic apparatus further includes a detection range setting unit which moves the detection range according to the positions of the face areas detected by the face detection unit.

Further, the above electronic apparatus may be such that the detection range setting unit sets the detection range to make the center position of the detection range correspond to the center position of each of the image areas of the captured images in an initial state.

The above electronic apparatus may further include a movement amount determination unit which determines whether or not the amount of movement of each of the face areas is a predetermined threshold value or more based on the position of the face area detected by the face detection unit from each of the plurality of images, wherein when the movement amount determination unit determines that the amount of movement of the face area is the predetermined threshold value or more, the face detection unit disables the detection of the face area, while when the movement amount determination unit determines that the amount of movement of the face area is less than the predetermined threshold value, the face detection unit enables the detection of the face area.

Further, an electronic apparatus, according to one or more embodiments of the present invention, includes: a memory which temporarily stores image data of an image captured by an imaging device; and a processor which processes image data stored in the memory, the processor including: a face detection unit which processes image data of a plurality of images captured by the imaging device at predetermined time intervals and stored in the memory to detect a face area with a face captured therein from among the plurality of images; and a movement amount determination unit which determines whether or not the amount of movement of the face area is a predetermined threshold value or more based on the position of the face area detected by the face detection unit from among the plurality of images, wherein when the movement amount determination unit determines that the amount of movement of the face area is the predetermined threshold value or more, the face detection unit disables the detection of the face area, while when the movement amount determination unit determines that the amount of movement of the face area is less than the predetermined threshold value, the face detection unit enables the detection of the face area.

The above electronic apparatus may further include a sensor which detects the movement of the electronic apparatus, wherein the movement amount determination unit determines the amount of movement of the face area detected by the face detection unit in consideration of the movement of the electronic apparatus detected by the sensor.

The above electronic apparatus may further include: a processing unit which executes system processing based on a system; a person determination unit which determines that a user is present when the detection of the face area detected by the face detection unit is enabled, and determines that the user is absent when the face area is not detected by the face detection unit or when the detection of the face area detected by the face detection unit is disabled; and an operation control unit which causes the operating state of the system to make a transition from a first operating state in which at least part of the system processing is limited to a second operating state in which the operation of the system processing is more activated than the first operating state when the determination result of the person determination unit is that a transition from a state where the user is absent to a state where the user is present is made.

Further, a control method for an electronic apparatus, according to one or more embodiments of the present invention, where the electronic apparatus includes a memory which temporarily stores image data of an image captured by an imaging device, and a processor which processes image data stored in the memory, the control method including: a step of causing a face detection unit to process image data of a plurality of images captured by the imaging device at predetermined time intervals and stored in the memory to detect face areas with faces captured therein from among the plurality of images based on first-resolution image data and second-resolution image data; and a step of causing a detection state determination unit to determine whether or not the face areas are consecutively detected from the plurality of images, wherein in the step of causing the face detection unit to detect the face areas, when the detection state determination unit determines that a state is changed between a state where the face areas are consecutively detected and a state where the face areas are not consecutively detected while performing processing to detect the face areas based on the first-resolution image data, the face detection unit detects the face areas from the plurality of images based on the second-resolution image data.

The above-described embodiments of the present invention can detect a person using the electronic apparatus accurately.

DETAILED DESCRIPTION

Embodiments of the present invention will be described below with reference to the accompanying drawings.

First Embodiment

[Outline]

First, the outline of an electronic apparatus 1 according to a first embodiment will be described. The electronic apparatus 1 according to the present embodiment is, for example, a laptop PC (Personal Computer). Note that the electronic apparatus 1 may also be an electronic apparatus of any other form, such as a desktop PC, a tablet terminal device, or a smartphone.

The electronic apparatus 1 can make a transition at least between a normal operating state (power-on state) and a standby state as system operating states. The normal operating state is an operating state capable of executing processing without being particularly limited, which corresponds, for example, to S0 state defined in the ACPI (Advanced Configuration and Power Interface) specification. The standby state is a state in which at least part of system processing is limited. For example, the standby state may be the standby state or a sleep state, or a state corresponding to modern standby in Windows (registered trademark) or S3 state (sleep state) defined in the ACPI specification. For example, the standby state is an operating state lower in power consumption than the normal operating state.

In the following, a transition of the system operating state from the standby state to the normal operating state may also be called "boot." In the standby state, since the activation level is generally lower than the normal operating state, the boot of the system of the electronic apparatus 1 leads to the activation of the operation of the system in the electronic apparatus 1.

Figure 1A:
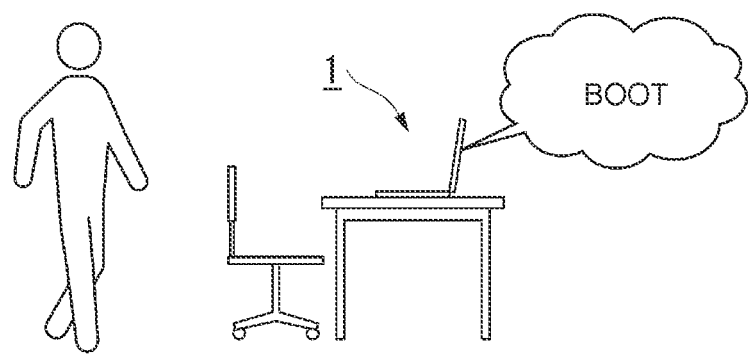
FIGS. 1A, 1B, and 1C are diagrams for describing an outline of HPD processing of an electronic apparatus according to a first embodiment.
Figure 1B:
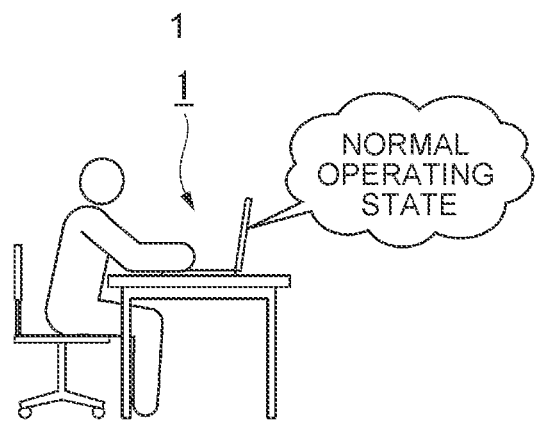
Figure 1C:
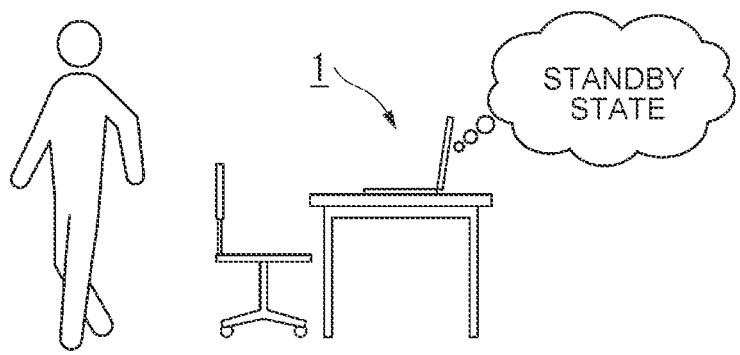

FIG. 1 is a diagram for describing an outline of HPD processing of the electronic apparatus 1 according to the present embodiment. The electronic apparatus 1 detects a person (i.e., a user) present in the neighborhood of the electronic apparatus 1. This processing for detecting the presence of a person is called HPD (Human Presence Detection) processing. The electronic apparatus 1 detects the presence or absence of a person by the HPD processing to control the operating state of the system of the electronic apparatus 1 based on the detection result. For example, as illustrated in FIG. 1A, when detecting a change from a state where no person is present in front of the electronic apparatus 1 (Absence) to a state where a person is present (Presence), that is, when detecting that a person has approached the electronic apparatus 1 (Approach), the electronic apparatus 1 determines that a user has approached and automatically boots the system to make a transition to the normal operating state. Further, in a state where a person is present in front of the electronic apparatus 1 (Presence) as illustrated in FIG. 1B, the electronic apparatus 1 determines that the user is present and continues the normal operating state. Then, as illustrated in FIG. 1C, when detecting a change from the state where the person is present in front of the electronic apparatus 1 (Presence) to a state where no person is present (Absence), that is, when detecting that the person has left the electronic apparatus 1 (Leave), the electronic apparatus 1 determines that the user has left and causes the system to make the transition to the standby state.

For example, the electronic apparatus 1 performs face detection to detect a face area with a face captured therein from a captured image obtained by capturing the front side in order to determine whether or not the user is present in front of the electronic apparatus 1. When the face area is detected from the captured image, the electronic apparatus 1 determines that the user is present. On the other hand, when no face area is detected from the captured image, the electronic apparatus 1 determines that the user is absent. Here, when the face area is detected from the captured image, it may be difficult to detect the face area depending on the face orientation or the like. In such a case, face detection may become unstable, such as that the face area is not detected even when a person is present. An example in which face detection becomes unstable will be described with reference to FIG. 2.

Figure 2:
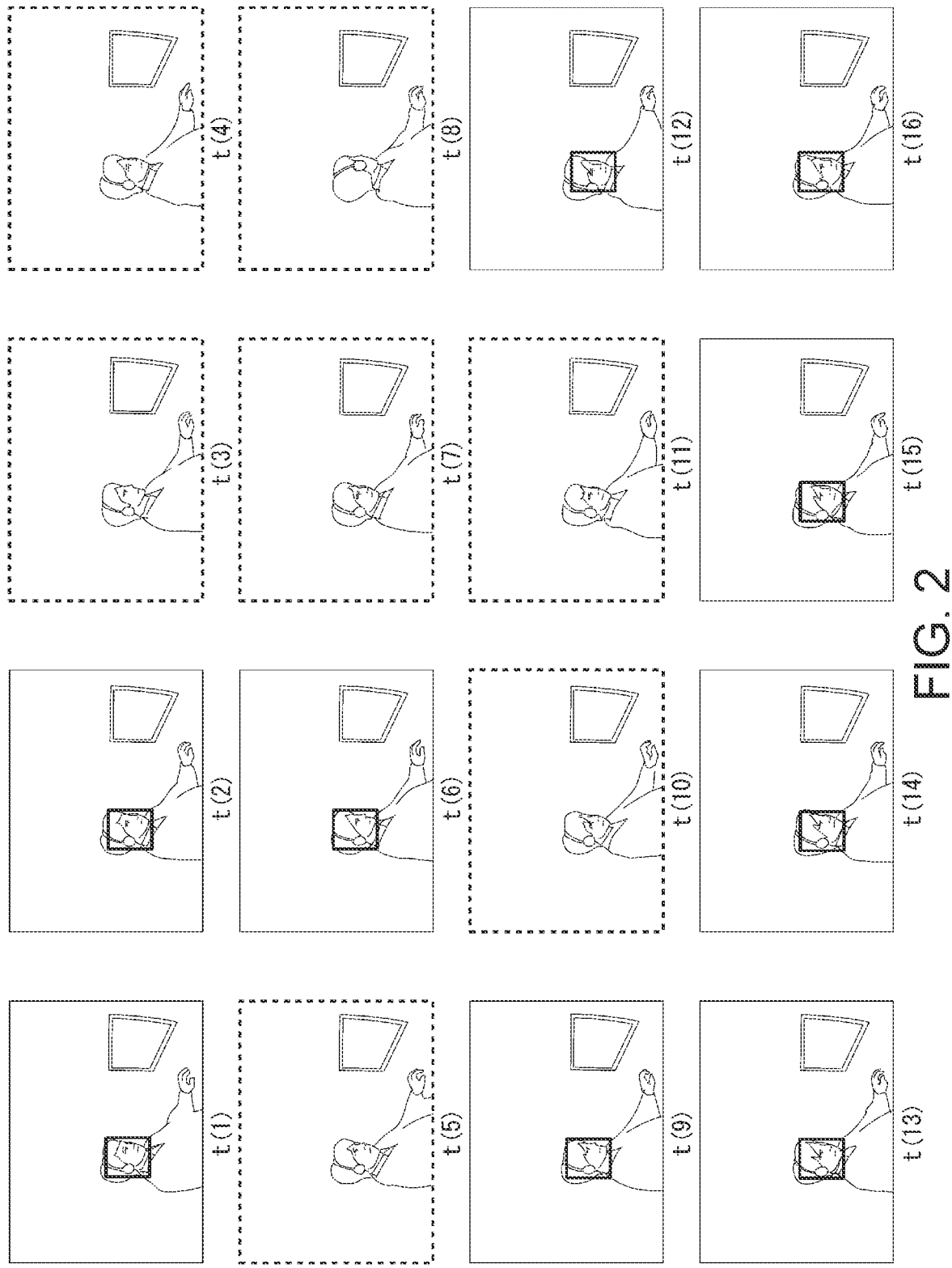
FIG. 2 is a diagram illustrating an example of a situation in which face detection becomes unstable.

FIG. 2 is a diagram illustrating an example of a situation in which face detection becomes unstable. In the illustrated example, captured images captured by the electronic apparatus 1 at predetermined time intervals are illustrated in chronological order from time t(1) to time t(16). Here, the situation is that the user is using a second display connected to the electronic apparatus 1, and a side profile of the user appears in each captured image on the electronic apparatus 1. Since the side profile has less information as the features of the face than the front face, it is difficult to detect the side profile. Therefore, the captured images from time t(1) to time t(16) contain images with face areas detected and images without detected face areas. FIG. 2 illustrates that face areas are detected from captured images at time t(1) and time t(2), time t(6), time t(9), and time t(12) to time t(16) surrounded by the solid line frame, and no face area is detected from captured images at time t(3) to time t(5), time t(7) and time t(8), and time t(10) and time t(11) surrounded by the dashed line frame. In such a case, face detection becomes unstable and hence it might be erroneously detected that the user is absent despite the presence of the user using the electronic apparatus 1.

Therefore, in the present embodiment, when any face area is no longer detected from a state where face areas are detected consecutively from captured images (or when face detection becomes unstable), since face detection may be unsuccessful, the electronic apparatus 1 detects a face area by focusing on an area in which the face has been detected until then in subsequent face detection. Specifically, based on the face area with the face previously detected, the electronic apparatus 1 estimates a position at which the face is captured to detect a face area by enlarging an image area based on the estimated position.

Figure 3:
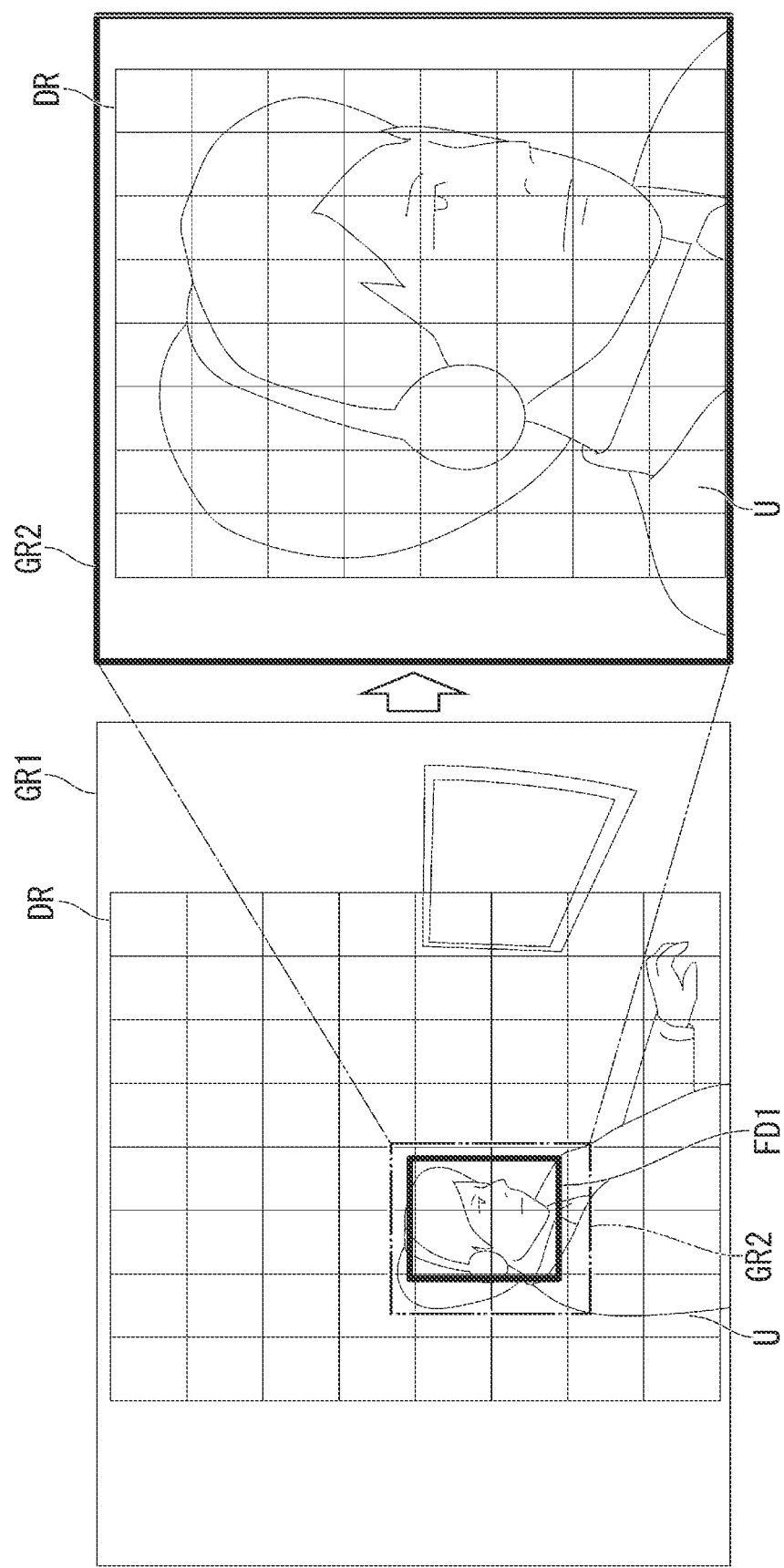
FIG. 3 is a diagram illustrating an example of a face detection area according to the first embodiment.

FIG. 3 is a diagram illustrating an example of a detection area of the face according to the present embodiment. Symbol GR1 indicates the whole image area of a captured image. Symbol DR denotes a detection range when a face is detected from the captured image. Note that squares inside the detection range DR schematically represent the resolution at the time of detection, which are not to identify the number of scares (resolution) at the time of actual detection. Further, symbol FD1 indicates a face area with the face detected from an image area corresponding to the detection range DR in the captured image. Here, when any face area is no longer detected from a state where face areas are detected consecutively from captured images, the electronic apparatus 1 estimates a position at which the face is captured based on the face areas detected previously to detect a face area by enlarging the image area GR2 based on the estimated position. Since the electronic apparatus 1 detects a face area by applying the detection range DR to the enlarged image area GR2, the face area is detected at a higher resolution. Thus, the electronic apparatus 1 can improve the detection accuracy of a face difficult to detect such as the side profile. In the following description, the fact that a face area is detected by applying the detection range DR to the whole image area GR1 of a captured image is simply referred to as that "a face area is detected from a captured image." Further, the fact that "a face area is detected by applying the detection range DR to the image area GR2 enlarged from the captured image is simply referred to as that "a face area is detected from the image area GR2."

For example, the image area GR2 is set to an area including the face area FD1, in which the face is detected from the captured image, and which is wider than the face area FD1. As an example, the image area GR2 may be an area set to 120% of the face area FD1. Further, the image area GR2 may be set based on the face area FD1 only in a frame when the last face area is detected, or based on the face areas FD1 in plural frames in which the face areas are detected. The plural frames are plural frames from the frame when the last face area is detected up to a frame a predetermined number of frames (for example, three frames) before the frame. When face areas FD1 in the plural frames are used, the image area GR2 is set to include an area obtained by combining the plural face areas FD1.

Next, the configuration of the electronic apparatus 1 according to the present embodiment will be described in detail.

[Appearance Configuration of Electronic Apparatus]

Figure 4:
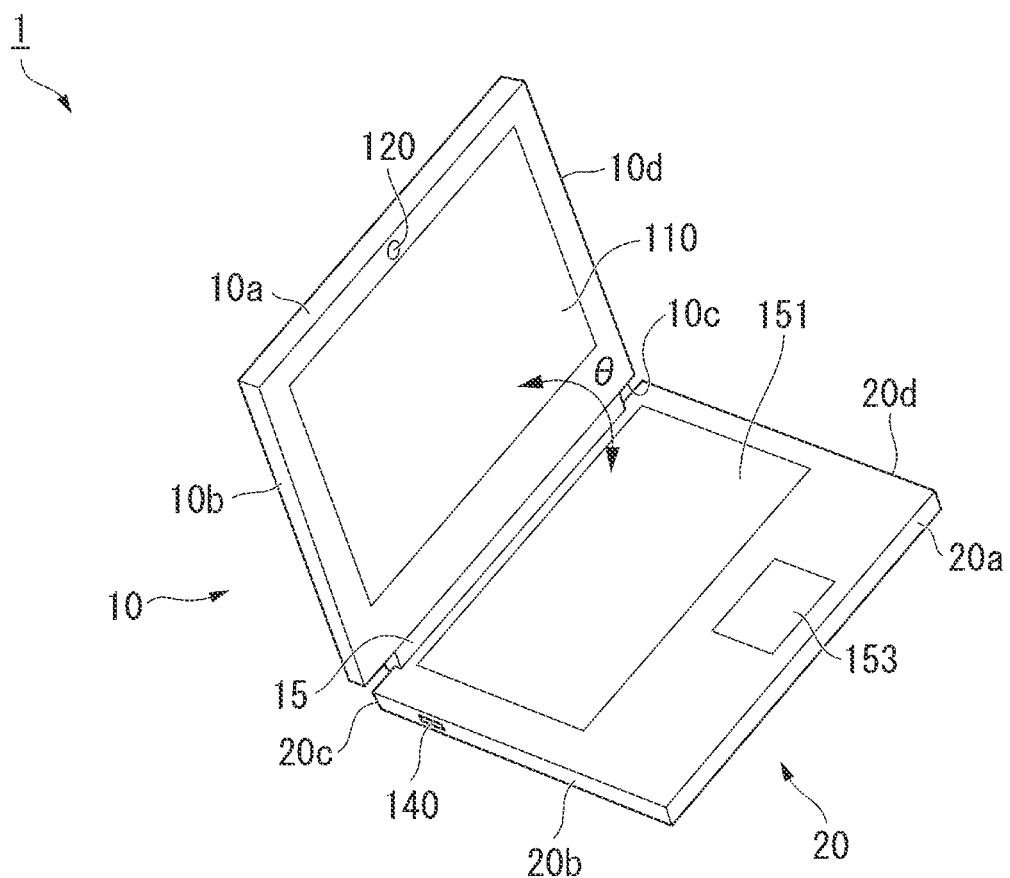
FIG. 4 is a perspective view illustrating an appearance configuration example of the electronic apparatus according to the first embodiment.

FIG. 4 is a perspective view illustrating an appearance configuration example of the electronic apparatus 1 according to the present embodiment.

The electronic apparatus 1 includes a first chassis 10, a second chassis 20, and a hinge mechanism 15. The first chassis 10 and the second chassis 20 are coupled by using the hinge mechanism 15. The first chassis 10 is rotatable around an axis of rotation formed by the hinge mechanism 15 relative to the second chassis 20. An open angle by the rotation between the first chassis 10 and the second chassis 20 is denoted by "θ."

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as the side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c to the side face 20a is referred to as "front." The right hand and left hand in the rearward direction are referred to as "right" and "left," respectively. Left side faces of the first chassis 10 and the second chassis 20 are referred to as side faces 10b and 20b, respectively, and right side faces thereof are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open, is referred to as an "open state."

The appearance of the electronic apparatus 1 in FIG. 4 illustrates an example of the open state. The open state is a state where the side face 10a of the first chassis 10 and the side face 20a of the second chassis 20 are separated. In the open state, the respective inner faces of the first chassis 10 and the second chassis 20 appear. The open state is one of states when the user uses the electronic apparatus 1, and the electronic apparatus 1 is often used in a state where the open angle is typically about θ=100° to 130°. Note that the range of open angles θ to be the open state can be set arbitrarily according to the range of angles rotatable by the hinge mechanism 15 or the like.

A display unit 110 is provided on the inner face of the first chassis 10. The display unit 110 is configured to include a liquid crystal display (LCD) or an organic EL (Electro Luminescence) display, and the like. Further, an imaging unit 120 is provided in a peripheral area of the display unit 110 on the inner face of the first chassis 10. For example, the imaging unit 120 is arranged on the side of the side face 10a in the peripheral area of the display unit 110. Note that the position at which the imaging unit 120 is arranged is just an example, and it may be elsewhere as long as the imaging unit 120 can face a direction (frontward) to face the inner face of the first chassis 10.

In the open state, the imaging unit 120 captures a predetermined imaging range in the direction (frontward) to face the inner face of the first chassis 10. The predetermined imaging range is a range of angles of view defined by an image sensor included in the imaging unit 120 and an optical lens provided in front of the imaging surface of the image sensor. For example, the imaging unit 120 can capture images including a person present in front of the electronic apparatus 1.

Further, a power button 140 is provided on the side face 20b of the second chassis 20. The power button 140 is an operating element used by the user to give instructions to boot the system (a transition from the standby state to the normal operating state) and to make a transition from the normal operating state to the standby state. Further, a keyboard 151 and a touch pad 153 are provided as an input device on the inner face of the second chassis 20. Note that a touch sensor may also be included as the input device instead of or in addition to the keyboard 151 and the touch pad 153, or a mouse and an external keyboard may be connected. When the touch sensor is provided, an area corresponding to the display surface of the display unit 110 may be constructed as a touch panel for accepting operations. Further, a microphone used to input voice may be included in the input device.

In the closed state where the first chassis 10 and the second chassis 20 are closed, the display unit 110 and the imaging unit 120 provided on the inner face of the first chassis 10, and the keyboard 151 and the touch pad 153 provided on the inner face of the second chassis 20 are covered with each other's chassis faces, respectively, and put in a state of being disabled from fulfilling the functions thereof.

[Configuration of Electronic Apparatus]

Figure 5:
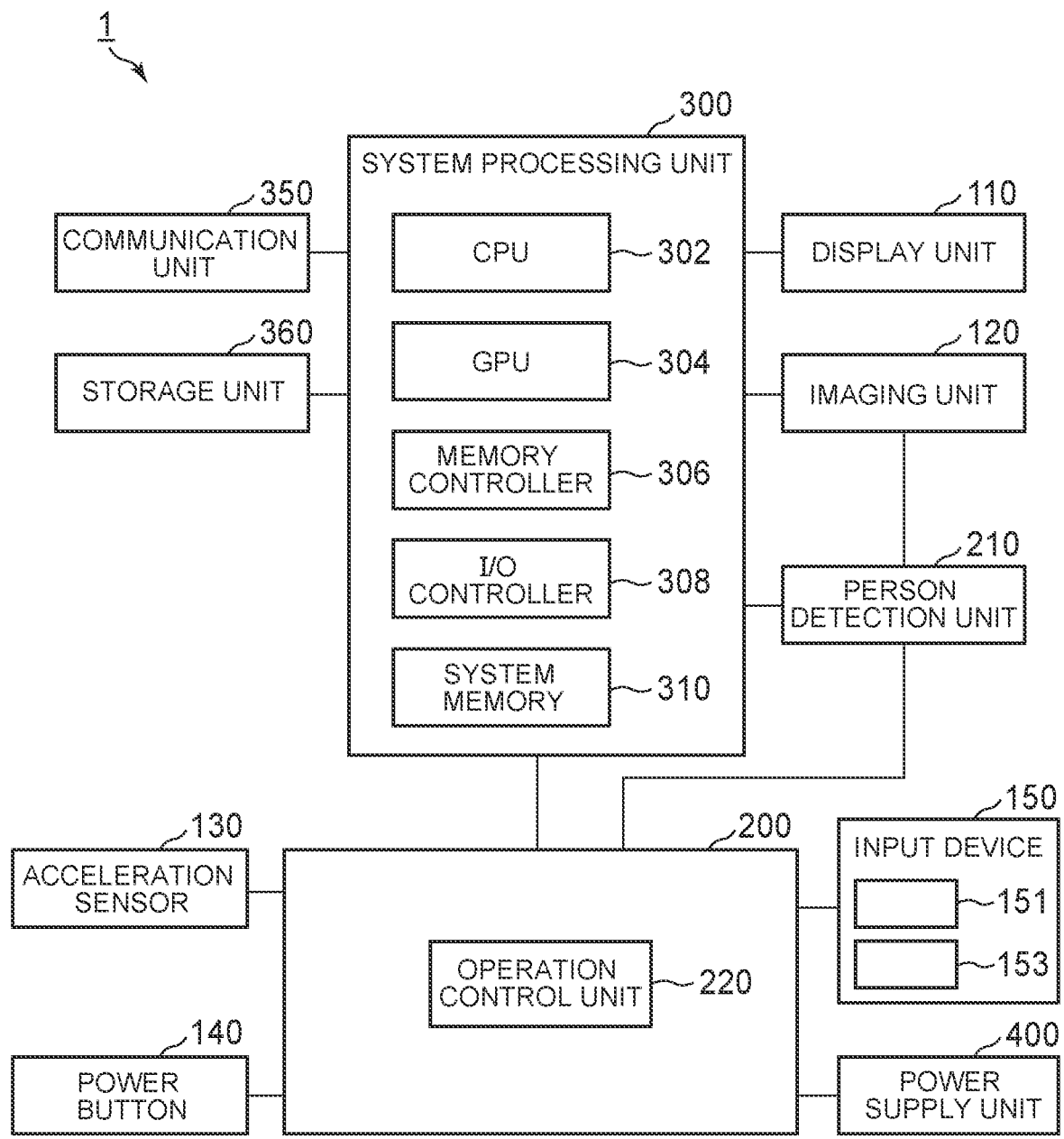
FIG. 5 is a schematic block diagram illustrating a configuration example of the electronic apparatus according to the first embodiment.

FIG. 5 is a schematic block diagram illustrating a configuration example of the electronic apparatus 1 according to the present embodiment. The electronic apparatus 1 is configured to include the display unit 110, the imaging unit 120, an acceleration sensor 130, the power button 140, the input device 150, an EC (Embedded Controller) 200, a person detection unit 210, a system processing unit 300, a communication unit 350, a storage unit 360, and a power supply unit 400. The display unit 110 displays display data (images) generated based on system processing executed by the system processing unit 300, processing of an application program running in the system processing, and the like.

The imaging unit 120 captures an image of an object within a predetermined angle of view in a direction (frontward) to face the inner face of the first chassis 10, and outputs the captured image to the system processing unit 300 and the person detection unit 210. The imaging unit 120 may be an infrared camera or a normal camera. The infrared camera is a camera including an infrared sensor as an image sensor. The normal camera is a camera including, as an image sensor, a visible light sensor for receiving a visible light beam (for example, an RGB camera). In the case of the normal camera, a captured image used for face detection may also be an image with a reduced number of colors (for example, a monochrome image).

The acceleration sensor 130 detects the movement of the electronic apparatus 1 and outputs, to the EC 200, a detection signal indicative of the detection result. For example, when the electronic apparatus 1 is moved or the electronic apparatus 1 is moving unstably by being hand-held, the acceleration sensor 130 outputs a detection signal according to the movement. Note that a gyro sensor, a tilt sensor, a geomagnetic sensor, and the like may also be included instead of or in addition to the acceleration sensor 130.

The power button 140 outputs, to the EC 200, operation signals according to user's operations. The input device 150 is an input unit for accepting user's input, which is configured to include, for example, the keyboard 151 and the touch pad 153. In response to accepting operations on the keyboard 151 and the touch pad 153, the input device 150 outputs, to the EC 200, operation signals indicative of the content of the operations.

The power supply unit 400 supplies power through a power system for supplying power to each unit of the electronic apparatus 1 according to the operating state of each unit of the electronic apparatus 1. The power supply unit 400 includes a DC (Direct Current)/DC converter. The DC/DC converter converts the voltage of DC power, supplied from an AC (Alternate Current)/DC adapter or a battery pack, to a voltage required for each unit. The power with the voltage converted by the DC/DC converter is supplied to each unit through each power system. For example, the power supply unit 400 supplies power to each unit through each power system based on a control signal according to the operating state of each unit input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program (firmware) prestored in the ROM thereof and executes the read control program to fulfill the function. The EC 200 operates independently of the system processing unit 300 to control the operation of the system processing unit 300 and manage the operating state of the system processing unit 300. Further, the EC 200 is connected to the acceleration sensor 130, the power button 140, the input device 150, the person detection unit 210, the power supply unit 400, and the like.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the electronic apparatus 1. Further, the EC 200 acquires operation signals from the power button 140 and the input device 150, and outputs, to the system processing unit 300, an operation signal related to processing of the system processing unit 300 among the acquired operation signals. Further, the EC 200 detects the movement of the electronic apparatus 1 based on the detection signal from the acceleration sensor 130. For example, based on the detection signal from the acceleration sensor 130, the EC 200 detects whether the electronic apparatus 1 is in a stationary state or a moving state. Further, the EC 200 includes an operation control unit 220 to control the operation of the system based on the detection result by the person detection unit 210.

The person detection unit 210 is a processor for processing image data of a captured image captured by the imaging unit 120. For example, the person detection unit 210 acquires the captured image captured by the imaging unit 120 through the system processing unit 300. Note that the person detection unit 210 may also acquire the captured image captured by the imaging unit 120 directly from the imaging unit 120. The person detection unit 210 detects the presence of the user by detecting a face area from the captured image to execute the HPD processing based on the detection result.

The person detection unit 210 detects the face area from the captured image captured by the imaging unit 120 to detect whether or not the user is present in front of the electronic apparatus 1. For example, when the user approaches the electronic apparatus 1, the person detection unit 210 changes the detection state from a state where the user is not present in front of the electronic apparatus 1 to a state where the user is present. Further, when the user is using the electronic apparatus 1 in front of the electronic apparatus 1, the person detection unit 210 is continuously detecting the state where the user is present in front of the electronic apparatus 1. Further, when the user has left the electronic apparatus 1, the person detection unit 210 changes the detection state from the state where the user is present in front of the electronic apparatus 1 to the state where the user is not present. Thus, the person detection unit 210 can detect whether or not the user is present in front of the electronic apparatus 1 to detect that the user approaches the electronic apparatus 1 (Approach), that the user is present in front of the electronic apparatus 1 (Presence), that the user has left the electronic apparatus 1 (Leave), that the user is absent in front of the electronic apparatus 1 (Absence), or the like. The configuration of this person detection unit 210 will be described in detail later.

The operation control unit 220 controls the operating state of the system according to the HPD processing. For example, in the standby state, when a change from the state where the user is not present in front of the electronic apparatus 1 to the state where the user is present (that is, the approach of the user to the electronic apparatus 1) is detected by the person detection unit 210, the operation control unit 220 boots the system in the standby state. Specifically, when the approach of the user to the electronic apparatus 1 is detected by the person detection unit 210, the operation control unit 220 instructs the system processing unit 300 to boot the system. More specifically, when the system is booted, the operation control unit 220 outputs, to the power supply unit 400, a control signal to supply power necessary for the operation of each unit of the electronic apparatus 1. Afterward, the operation control unit 220 outputs a boot signal to the system processing unit 300 to instruct the system processing unit 300 to boot the system. When acquiring the boot signal, the system processing unit 300 boots the system to make the transition from the standby state to the normal operating state.

Further, when the state where the user is present in front of the electronic apparatus 1 is continuously being detected by the person detection unit 210, the operation control unit 220 causes the system processing unit 300 to restrict the system not to make a transition to the standby state so as to continue the normal operating state. However, even when the state where the user is present is continuously being detected by the person detection unit 210, the operation control unit 220 may make the transition from the normal operating state to the standby state depending on a predetermined condition. The predetermined condition is, for example, that the duration of non-operation has lasted for a preset period of time, that an operation to make the transition to the standby state is performed, or the like.

Further, in normal operation, when a change from the state where the user is present in front of the electronic apparatus 1 to the state where the user is not present (that is, the leave of the user from the electronic apparatus 1) is detected by the person detection unit 210, the operation control unit 220 instructs the system processing unit 300 to cause the system to make the transition from the normal operating state to the standby state. More specifically, the operation control unit 220 outputs, to the system processing unit 300, a standby signal to instruct the system processing unit 300 to cause the system to make the transition from the normal operating state to the standby state. When acquiring the standby signal, the system processing unit 300 causes the system to make the transition from the normal operating state to the standby state. Afterward, the operation control unit 220 outputs a control signal to the power supply unit 400 to stop the supply of power unnecessary in the standby state.

The system processing unit 300 is configured to include a CPU (Central Processing Unit) 302, a GPU (Graphic Processing Unit) 304, a memory controller 306, an I/O (Input-Output) controller 308, and a system memory 310, where processes of various application programs are executable on an OS (Operating System) by system processing based on the OS. The CPU 302 and the GPU 304 may be collectively called a processor.

The CPU 302 executes processing by the OS and processing by the application programs running on the OS. Further, the CPU 302 causes the operating state of the system to make a transition based on the control of the operating state of the system by the EC 200 (operation control unit 220). For example, when the operating state is the standby state and the boot signal is input from the EC 200, the CPU 302 executes boot processing to make the transition from the standby state to the normal operating state. After completion of the boot processing, the CPU 302 starts the execution of system processing based on the OS. For example, when the operating state is the standby state and the boot signal is input from the EC 200, the CPU 302 resumes the execution of the application programs the execution of which is suspended.

In the boot processing, the CPU 302 executes login processing to determine whether to allow access to the OS or not. When the boot processing by the OS is started, the CPU 302 executes the login processing before allowing the access to the OS, and the transition to the normal operating state is paused until login is allowed in the login processing. In the login processing, user authentication processing is performed to determine whether or not a person using the electronic apparatus 1 is a preregistered, authorized user. As the authentication, there are password authentication, face authentication, fingerprint authentication, and the like. When the authentication result is successful, the CPU 302 allows the login and resumes the execution of the paused system processing. On the other hand, when the authentication result is unsuccessful, the CPU 302 does not allow the login and leaves the execution of the system processing paused.

The GPU 304 is connected to the display unit 110. The GPU 304 executes image processing under the control of the CPU 302 to generate display data. The GPU 304 outputs the generated display data to the display unit 110. Note that the CPU 302 and the GPU 304 may be integrally formed as one core, or the load may be shared between the CPU 302 and the GPU 304 formed as individual cores, respectively. The number of processors is not limited to one, and it may be plural.

The memory controller 306 controls reading data from and writing data to the system memory 310, the storage unit 360 and the like by the CPU 302 and the GPU 304.

The I/O controller 308 controls input/output of data from the communication unit 350, the display unit 110, and the EC 200.

The system memory 310 is used as a reading area of an execution program of the processor and a working area to write processed data. Further, the system memory 310 temporarily stores image data of a captured image(s) captured by the imaging unit 120.

The communication unit 350 is connected to other devices communicably through a wireless or wired communication network to transmit and receive various data. For example, the communication unit 350 is configured to include a wired LAN interface such as the Ethernet (registered trademark), a wireless LAN interface such as Wi-Fi (registered trademark), and the like.

The storage unit 360 is configured to include storage media, such as an HDD (Hard Disk Drive) or an SDD (Solid State Drive), a RAM, a ROM, and the like. The storage unit 360 stores the OS, device drivers, various programs such as applications, and various data acquired by the operation of the programs.

[Configuration of Person Detection Unit]

Next, the configuration of the person detection unit 210 will be described in detail. The person detection unit 210 detects the user present in front of the electronic apparatus 1 by detecting face areas respectively from captured images captured by the imaging unit 120 at predetermined time intervals.

Figure 6:
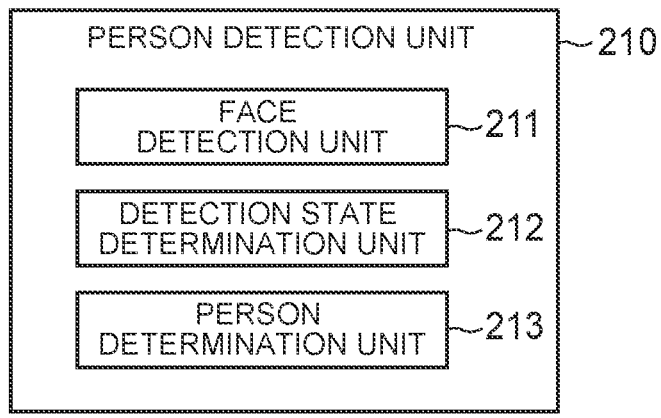
FIG. 6 is a block diagram illustrating an example of the configuration of a person detection unit according to the first embodiment.

FIG. 6 is a block diagram illustrating an example of the configuration of the person detection unit 210 according to the present embodiment. The person detection unit 210 illustrated includes a face detection unit 211, a detection state determination unit 212, and a person determination unit 213.

The face detection unit 211 detects face areas with faces captured therein from captured images captured at the predetermined time intervals, respectively. For example, the face detection unit 211 processes image data of plural images captured by the imaging unit 120 at the predetermined time intervals and stored in the system memory 310 to detect face areas with faces captured therein from among the plural images. As the face detection method, any detection method using a face detection algorithm to detect a face based on face feature information, trained data (learned model) subjected to machine learning based on face feature information, a face detection library, or the like can be applied. Further, for example, although the predetermined time intervals can be 15 second intervals or 10 second intervals, the predetermined time intervals can be set to any time intervals. In the case of the shortest time intervals, face areas in all consecutive frames are detected frame by frame.

The face detection unit 211 detects face areas respectively from captured images and outputs face detection information including the detected face areas. Note that the face detection information may also include the center coordinates of the face areas. When each face area is detected from each captured image, the face detection unit 211 stores face detection information including the face area in association with time information (frame information) of the captured image. Further, when any face area is not detected from the captured image, the face detection unit 211 stores face-undetected information indicating that any face area is not detected in association with time information (frame information) of the captured image. In other words, the face detection unit 211 stores a detection result history of the face area.

Further, when any face area is no longer detected from a state where face areas are detected consecutively from captured images, the face detection unit 211 detects a face area by enlarging the image area GR2 (see FIG. 3) based on the face area FD1 previously detected from a captured image upon detecting the face area from a captured image afterward. Note that the face detection unit 211 can acquire the face area FD1, previously detected from a captured image, from the detection result history of face areas. When it is determined by the detection state determination unit 212 that face detection is unstable, the face detection unit 211 may also detect the face area by enlarging the image area GR2 upon detecting the face area from the captured image afterward.

Further, the face detection unit 211 detects face areas at a low resolution (first resolution) as a reduced resolution respectively from captured images, and when any face area is no longer detected from a state where face areas are consecutively detected from captured images at the low resolution, the face detection unit 211 detects a face area at a high resolution (second resolution) upon detecting the face area by enlarging the image area GR2 from a captured image afterward. In other words, the face detection unit 211 performs face detection using two different modes, that is, a detection mode to detect a face from captured images at the low resolution and a detection mode to detect the face at the high resolution by enlarging the image area GR2 of each captured image. Typically, power consumption and the impact on other processing can be reduced by detecting face areas from captured images at the low resolution.

Further, when any face area cannot be detected from the image area GR2, the face detection unit 211 considers that a person has moved, ends the detection of a face area from the image area GR2, and returns to the detection of a face area from a captured image. For example, when any face area cannot be detected from the image area GR2 at the high resolution, the face detection unit 211 ends the detection of a face area from the image area GR2, and returns to the detection of a face area from a captured image at the low resolution.

The detection state determination unit 212 determines whether or not face detection is unstable based on the detection result history of face areas (face detection information and face-undetected information). Here, a state where face detection is stable (that is, a state where face detection is not unstable) indicates a state where face areas are detected consecutively from plural captured images captured by the imaging unit 120 at predetermined time intervals and stored in the system memory 310. On the other hand, a state where face detection is unstable indicates a state where face areas are not detected consecutively from plural captured images captured by the imaging unit 120 at the predetermined time intervals and stored in the system memory 310. This "state where face areas are not detected consecutively" means that face areas do not continue to be detected consecutively (that is, that the detection of face areas is intermittent), and does not mean that a state where face areas are not detected consecutively continues. For example, the "state where face areas are not detected consecutively" is a state where images with face areas detected by the face detection unit 211 and images without detected face areas are both included at a predetermined ratio in the captured images captured at the predetermined time intervals.

When determining that the state is changed between the state where the face areas are detected consecutively and the state where the face areas are not detected consecutively while performing processing to detect the face areas based on low-resolution image data, the detection state determination unit 212 may determine that face detection is unstable. For example, the detection state determination unit 212 may determine that face detection is unstable based on the fact that the state is changed from the state where the face areas are detected consecutively from captured images to the state where the face images are not detected consecutively. For example, the detection state determination unit 212 may determine that face detection is unstable based on the fact that the images with face areas detected by the face detection unit 211 and the images without detected face areas are both included in the captured images captured at the predetermined time intervals over a predetermined period. In this case, the detection state determination unit 212 may determine that face detection is unstable based on the ratio between the images with face areas detected and the images without detected face areas over the predetermined period, or may determine that face detection is unstable based on the fact that the images with face areas detected and the images without detected face areas are repeated over the predetermined period.

Then, when it is determined that face areas are detected at the low resolution as the reduced resolution respectively from captured images and face detection at the low resolution from the captured images becomes unstable, the face detection unit 211 may detect a face area at the high resolution by enlarging the image area GR2 from a captured image afterward.

[Operation of Face Detection Processing]

Here, the operation of face detection processing will be described with reference to FIG. 7.

Figure 7:
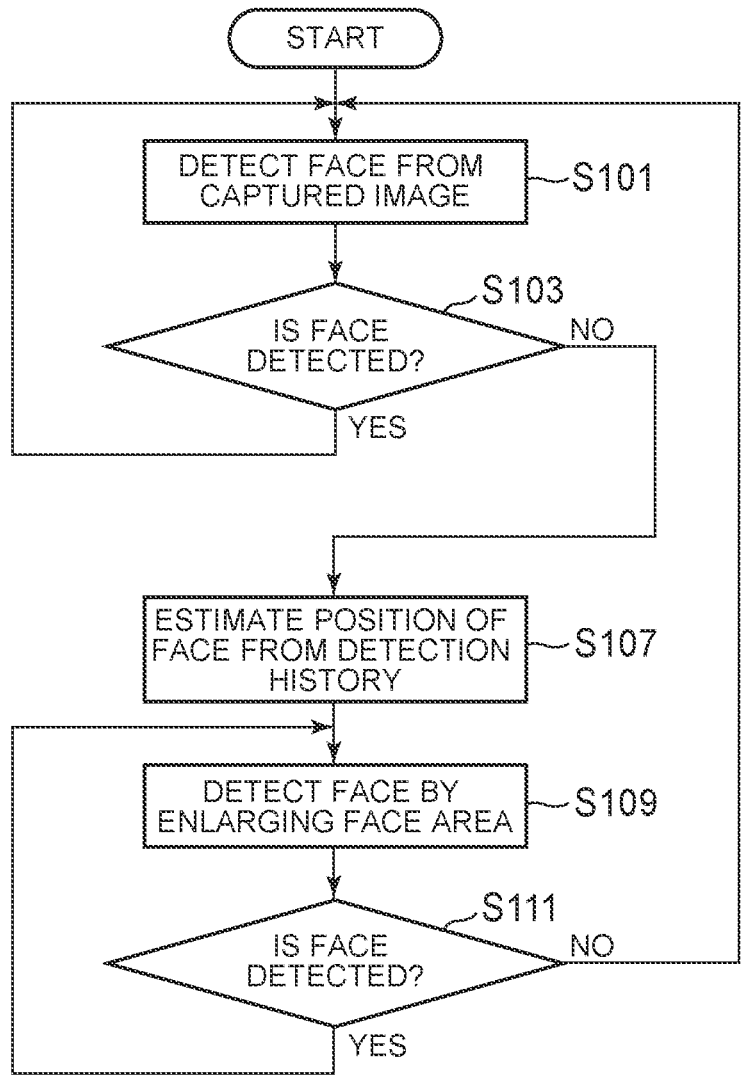
FIG. 7 is a flowchart illustrating a first example of face detection processing according to the first embodiment.

FIG. 7 is a flowchart illustrating a first example of face detection processing according to the present embodiment. Here, the operation of processing to detect a face area by enlarging the image area GR2 using, as a trigger, the fact that any face area is no longer detected from a captured image will be described.

(Step S101) The face detection unit 211 detects a face area respectively from each of captured images captured by the imaging unit 120 at the predetermined time intervals. For example, the face detection unit 211 detects a face area from a captured image in the n-th frame (n is an integer of 1 or more). Then, the face detection unit 211 proceeds to a process of step S103. At this time, the face detection unit 211 detects the face area from the captured image at the low resolution.

(Step S103) The face detection unit 211 determines whether or not the face area is detected from the captured image in step S101. When determining that the face area is detected from the captured image (YES), the face detection unit 211 stores, as a face detection result history, face detection information including the detected face area and the center coordinates of the face, and returns to the process of step S101. Then, in step S101, the face detection unit 211 detects a face area from a captured image in the next frame (captured image in the n+1-th frame). On the other hand, when determining in step S103 that any face area is not detected from the captured image (NO), the face detection unit 211 proceeds to a process of step S107.

(Step S107) The face detection unit 211 acquires, from the detection result history of face areas, the face area FD1 detected previously from a captured image to estimate the position of a face (the position at which the face is captured). Then, the face detection unit 211 proceeds to a process of step S109.

(Step S109) In the subsequent frames, the face detection unit 211 detects each face area by enlarging the image area GR2 based on the estimated face position (position at which the face is captured). At this time, the face detection unit 211 detects a face area from a captured image at the high resolution. Then, the face detection unit 211 proceeds to a process of step S111.

(Step S111) The face detection unit 211 determines whether or not the face area is detected from the captured image in step S109. When determining that the face area is detected from the captured image (YES), the face detection unit 211 stores, as the face detection result history, face detection information including the detected face area and the center coordinates of the face. Then, the face detection unit 211 returns to step S109 to detect the face from a captured image in the next frame at the high resolution by enlarging the image area GR2. On the other hand, when determining in step S111 that any face area is not detected (NO), the face detection unit 211 returns to the process of step S101. In other words, when any face area cannot be detected from the image area GR2 at the high resolution, the face detection unit 211 ends the detection of a face area from the image area GR2, and returns to the detection of a face area from a captured image at the low resolution.

Figure 8:
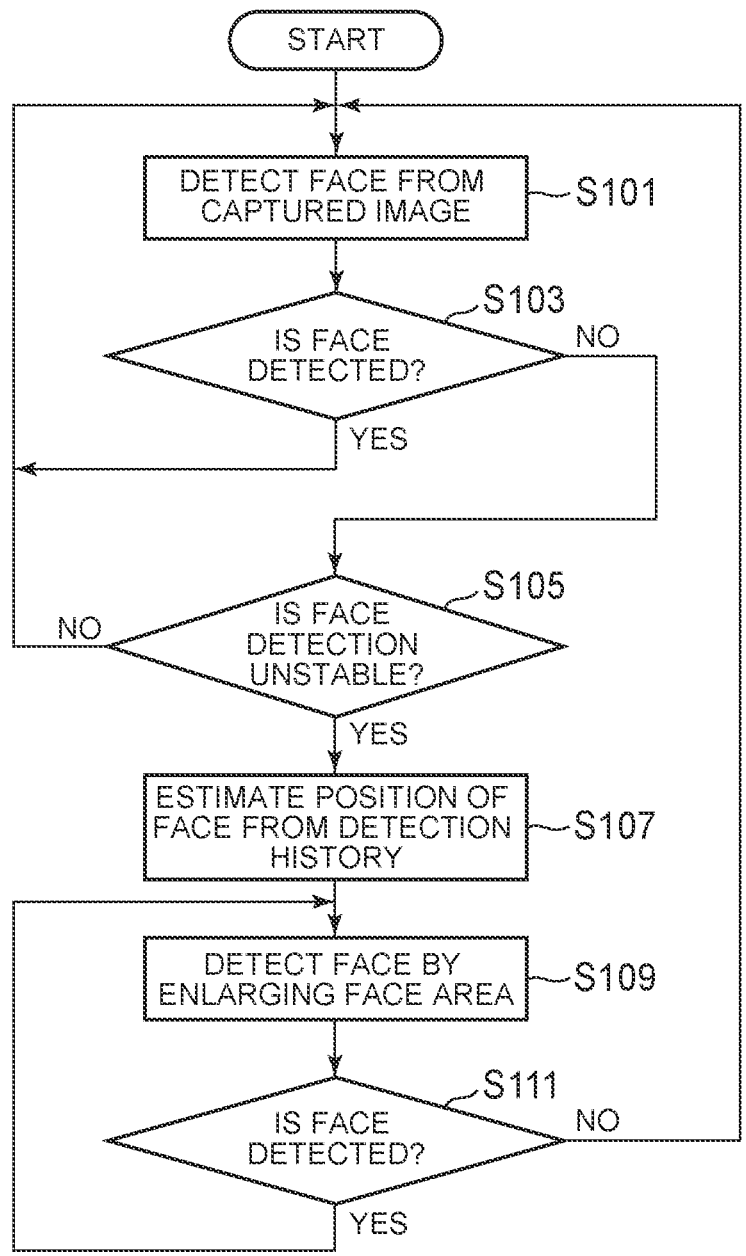
FIG. 8 is a flowchart illustrating a second example of the face detection processing according to the first embodiment.

Referring next to FIG. 8, the operation of processing to detect a face area by enlarging the image area GR2 using, as a trigger, the fact that face detection is unstable will be described.

FIG. 8 is a flowchart illustrating a second example of face detection processing according to the present embodiment. In FIG. 8, the same reference symbol is given to a process corresponding to each process in FIG. 7 to omit the description thereof. In the face detection processing illustrated in FIG. 8, when any face area is not detected from the captured image in step S103 (NO), the procedure proceeds to a process of step S105.

(Step S105) The detection state determination unit 212 determines whether or not face detection is unstable. For example, the detection state determination unit 212 may determine that face detection is unstable based on the fact that any face area is no longer detected from the state where face areas are consecutively detected from captured images. Further, the detection state determination unit 212 may determine that face detection is unstable based on the fact that the images with face areas detected by the face detection unit 211 and the images without detected face areas are both included in the captured images captured at the predetermined time intervals over the predetermined period. In this case, the detection state determination unit 212 may determine that face detection is unstable based on the ratio between the images with face areas detected and the images without detected face areas over the predetermined period, or may determine that face detection is unstable based on the fact that the images with face areas detected and the images without detected face areas are repeated over the predetermined period.

When determining in step S105 that face detection is unstable (YES), the detection state determination unit 212 proceeds to a process of step S107. Then, the face detection unit 211 estimates the position of a face (the position at which the face is captured) (step S107), and detects, in the subsequent frames, each face by enlarging the image area GR2 based on the estimated face position at the high resolution (step S109). On the other hand, when determining in step S105 that face detection is not unstable (NO), the detection state determination unit 212 returns to the process of step S101.

Returning to FIG. 6, the person determination unit 213 determines whether or not the user is present in front of the electronic apparatus 1 based on whether or not a face area is detected from a captured image by the face detection unit 211. For example, when the face area is detected from the captured image by the face detection unit 211, the person determination unit 213 determines that the user is present in front of the electronic apparatus 1. On the other hand, when any face area is not detected from the captured image by the face detection unit 211, the person determination unit 213 determines that the user is absent in front of the electronic apparatus 1. Note that even when the face area is detected from the captured image by the face detection unit 211, the person determination unit 213 may determine whether or not there is motion in the face detected respectively from each of captured images captured at the predetermined time intervals to determine that the user is present when there is motion. When determining that there is no motion in the detected face, the person determination unit 213 may determine that the user is absent by regarding the face as a detected face in a poster or a photo.

With such a configuration, the person detection unit 210 detects the user present in front of the electronic apparatus 1. Further, the person detection unit 210 detects a change from a state where the user is absent in front of the electronic apparatus 1 to a state where the user is present (i.e., the approach of the user to the electronic apparatus 1) by detecting whether or not the user is present in front of the electronic apparatus 1. Further, the person detection unit 210 detects a change from a state where the user is present in front of the electronic apparatus 1 to a state where the user is absent (i.e., the leave of the user from the electronic apparatus 1) by detecting whether or not the user is present in front of the electronic apparatus 1.

[Operation of Operating State Control Processing]

Next, the operation of operating state control processing to control the operating state of the system based on the result of the HPD processing using the face detection described above will be described. First, the operation of boot processing caused by the operation control unit 220 to boot the system as a result of the fact that the approach of the user to the electronic apparatus 1 is detected by the HPD processing will be described.

Figure 9:
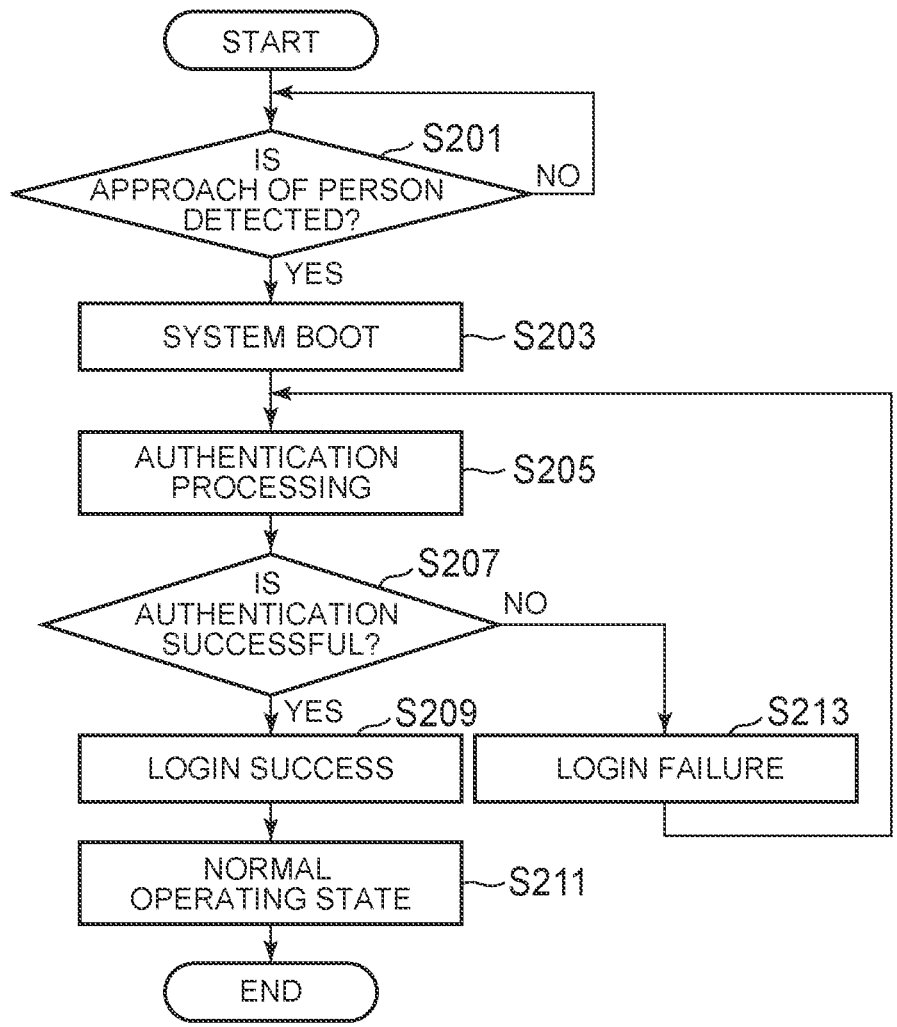
FIG. 9 is a flowchart illustrating an example of boot processing according to the first embodiment.

FIG. 9 is a flowchart illustrating an example of boot processing according to the present embodiment. Here, it is assumed that the electronic apparatus 1 is placed on a desk or the like in the open state, and the operating state is the standby state.

(Step S201) The operation control unit 220 determines whether or not the approach of the user to the electronic apparatus 1 is detected. When determining that the change from the state where the user is absent in front of the electronic apparatus 1 to the state where the user is present (i.e., the approach of the user to the electronic apparatus 1) is detected by the person detection unit 210 (YES), the operation control unit 220 proceeds to a process of step S203. On the other hand, when determining that the state where the user is absent (i.e., that the user does not approach the electronic apparatus 1) is detected by the person detection unit 210 (NO), the operation control unit 220 performs the process of step S201 again.

(Step S203) The operation control unit 220 causes the system processing unit 300 to boot the system. Specifically, when causing the system processing unit 300 to boot the system, the operation control unit 220 outputs, to the power supply unit 400, the control signal to supply power necessary for the operation of each unit of the electronic apparatus 1. Further, the operation control unit 220 outputs, to the system processing unit 300, the boot signal to instruct the system processing unit 300 to boot the system. When acquiring the boot signal, the system processing unit 300 starts boot processing. Then, the system processing unit 300 proceeds to a process of step S205.

(Step S205) The system processing unit 300 executes login processing (authentication processing). For example, the system processing unit 300 executes login processing by password authentication, face authentication, fingerprint authentication, or the like, and proceeds to a process of step S207.

(Step S207) The system processing unit 300 determines whether or not the authentication result is successful. When determining that the authentication result is successful (YES), the system processing unit 300 proceeds to a process of step S209. On the other hand, when determining that the authentication result is unsuccessful (NO), the system processing unit 300 proceeds to a process of step S213.

(Step S209) When the authentication result is successful, the system processing unit 300 notifies that the login is successful (for example, displays the notification on the display unit 110), and continues the boot processing. Then, the system processing unit 300 proceeds to a process of step S211.

(Step S211) The system processing unit 300 completes the login processing, and causes the operating state of the system to make the transition to the normal operating state.

(Step S213) When the authentication result is unsuccessful, the system processing unit 300 notifies that the login is unsuccessful (for example, displays the notification on the display unit 110), and returns to the authentication process in step S205. Note that the system processing unit 300 may stop the authentication processing to make a transition to a login disabled state when the authentication process fails continuously a predetermined number of times.

Next, the operation of transition-to-standby state processing in which the operation control unit 220 causes the system to make the transition from the normal operating state to the standby state as a result of the fact that the leave of the user from the electronic apparatus 1 is detected will be described.

Figure 10:
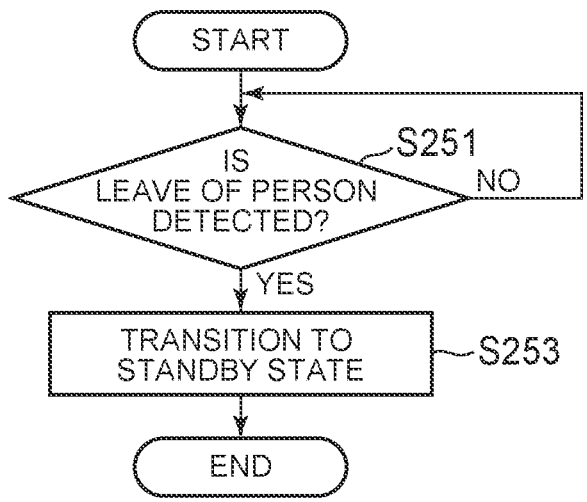
FIG. 10 is a flowchart illustrating an example of transition-to-standby state processing according to the first embodiment.

FIG. 10 is a flowchart illustrating an example of transition-to-standby state processing according to the present embodiment. Here, it is assumed that the electronic apparatus 1 is placed on the desk or the like in the open state, and the operating state thereof is the normal operating state.

(Step S251) The operation control unit 220 determines whether or not the leave of the user from the electronic apparatus 1 is detected. When a change from a state where the user is present to a state where the user is absent (i.e., the leave of the user from the electronic apparatus 1) is detected by the person detection unit 210 (YES), the operation control unit 220 proceeds to a process of step S253. On the other hand, when the state where the user is present (i.e., the user does not leave the electronic apparatus 1) is detected by the person detection unit 210 (NO), the operation control unit 220 performs the process of step S251 again.

(Step S253) The operation control unit 220 causes the operating state of the system to make the transition from the normal operating state to the standby state by the system processing unit 300. Specifically, the operation control unit 220 outputs, to the system processing unit 300, the standby signal to instruct the system processing unit 300 to cause the system to make the transition to the standby state. When acquiring the standby signal, the system processing unit 300 causes the operating state of the system to make the transition from the normal operating state to the standby state. Further, the operation control unit 220 outputs, to the power supply unit 400, the control signal to stop the supply of power unnecessary in the standby state.

Summary of First Embodiment

As described above, the electronic apparatus 1 according to the present embodiment detects face areas respectively from captured images captured at the predetermined time intervals. Then, when any face area is no longer detected from the state where face areas are consecutively detected from captured images, a face area is detected by enlarging the image area GR2 (an example of a specific area) based on a face area previously detected from a captured image upon detecting the face area from a captured image afterward.

Thus, since the electronic apparatus 1 can increase the detection rate of even a face difficult to detect such as a side profile, the user using the electronic apparatus 1 can be detected accurately. Further, since the electronic apparatus 1 enlarges the image area GR2 to detect a face area only when any face area is no longer detected from the state where face areas are consecutively detected, increased power consumption and the load on other processing can be reduced.

Further, the electronic apparatus 1 determines that face detection is unstable based on the fact that any face area is no longer detected from the state where face areas are consecutively detected from captured images. When it is determined that face detection is unstable, a face area may be detected by enlarging the image area GR2 upon detecting the face area from a captured image afterward.

Thus, since the electronic apparatus 1 can increase the detection rate when face detection becomes unstable, a person (user) using the electronic apparatus 1 can be detected accurately. Further, since the electronic apparatus 1 detects a face area by enlarging the image area GR2 only when it is determined that face detection is unstable, increased power consumption and the load on other processing can be reduced.

For example, the electronic apparatus 1 may determine that face detection is unstable based on the fact that the images with face areas detected and the images without detected face areas are both included in the captured images captured at the predetermined time intervals over the predetermined period. Thus, the electronic apparatus 1 can increase the detection rate when face detection becomes unstable.

Further, when any face area cannot be detected from the image area GR2, the electronic apparatus 1 ends the detection of a face area from the image area GR2, and returns to the detection of a face area from a captured image.

Thus, since the electronic apparatus 1 resets the detection area of a face by regarding a person as having moved when any face area cannot be detected from the image area GR2, the person (user) using the electronic apparatus 1 can be detected accurately.

Further, the electronic apparatus 1 detects face areas respectively from captured images at the low resolution (first resolution) as the reduced resolution. Then, when any face area is no longer detected from the state where face areas are consecutively detected from captured images at the low resolution, a face area may also be detected at the high resolution (second resolution) higher than the first resolution upon detecting the face area by enlarging the image area GR2 from a captured image afterward.

Thus, since the electronic apparatus 1 can increase the detection rate of even a face difficult to detect such as a side profile, the person (user) using the electronic apparatus 1 can be detected accurately. Further, since the electronic apparatus 1 detects a face area at the high resolution only when any face area is no longer detected from the state where face areas are consecutively detected, increased power consumption and the load on other processing can be reduced.

Further, when any face area cannot be detected from the image area GR2 at the high resolution, the electronic apparatus 1 ends the detection of a face area from the image area GR2, and returns to the detection of a face area from a captured image at the low resolution.

Thus, since the electronic apparatus 1 resets the detection area of a face by regarding a person as having moved when any face area cannot be detected from the image area GR2 even at the high resolution, the person (user) using the electronic apparatus 1 can be detected accurately.

Further, a control method for the electronic apparatus 1 according to the present embodiment includes: a step of detecting face areas respectively from captured images captured at predetermined time intervals; and a step in which when any face area is no longer detected from a state where face areas are consecutively detected from captured images, a face area is detected by enlarging the image area GR2 based on a face area previously detected from a captured image upon detecting the face area from a captured image afterward.

Thus, since the electronic apparatus 1 can increase the detection rate of even a face difficult to detect such as a side profile, the person (user) using the electronic apparatus 1 can be detected accurately. Further, since the electronic apparatus 1 detects a face area by enlarging the image area GR2 only when any face area is no longer detected from the state where face areas are consecutively detected, increased power consumption and the load on other processing can be reduced.

Further, the electronic apparatus 1 according to the present embodiment includes the system memory 310 (an example of a memory) for temporarily storing image data of images (captured images) captured by the imaging unit 120 (an example of an imaging device), and the person detection unit 210 (an example of a processor) for processing the image data stored in the system memory 310. The person detection unit 210 processes image data of plural captured images captured by the imaging unit 120 at the predetermined time intervals and stored in the system memory 310 to detect face areas with faces captured therein from among the plural captured images based on first-resolution image data and second-resolution image data. Further, the person detection unit 210 determines whether or not to be a state where face areas are consecutively detected from the plural captured images. Based on the first-resolution image data, when determining that the state is changed between the state where face areas are consecutively detected and a state where face areas are not consecutively detected while performing processing to detect the face areas, the person detection unit 210 detects face areas with faces captured therein from among the plural captured images based on the second-resolution image data.

Thus, since the electronic apparatus 1 can increase the detection rate by changing the resolution to detect face areas depending on the detection state of a face, the person (user) using the electronic apparatus 1 can be detected accurately.

For example, the person detection unit 210 determines to be the state where face areas are not consecutively detected based on the fact that images with face areas detected and images without detected face areas are both included at a predetermined ratio in the plural captured images captured at the predetermined time intervals over the predetermined period.

Thus, since the electronic apparatus 1 can increase the detection rate by changing the resolution to detect a face even when the face is difficult to detect such as a side profile and hence face detection becomes unstable, the person (user) using the electronic apparatus 1 can be detected accurately.

Further, the above first resolution is a low resolution lower than the above second resolution. When determining that the state is changed from the state where face areas are consecutively detected to the state where face areas are not consecutively detected while executing processing in the low-resolution mode to detect face areas based on the first-resolution image data, the person detection unit 210 executes processing in the high-resolution mode to perform the detection of a face area based on the second-resolution image data in a specific area (for example, the image area GR2) corresponding to the position of a face area detected by processing in the low-resolution mode.

Thus, since the electronic apparatus 1 can increase the detection rate by detecting the face area in the high-resolution mode when the face is a face difficult to detect such as a side profile and hence face detection becomes unstable, the person (user) using the electronic apparatus 1 can be detected accurately. Further, since the electronic apparatus 1 detects the face area in the high-resolution mode only when face detection becomes unstable, increased power consumption and the load on other processing can be reduced.

Further, when any face area cannot be detected from the specific area (for example, the image area GR2) in the high-resolution mode, the person detection unit 210 executes the detection of a face area in the low-resolution mode.

Thus, when any face area cannot be detected from the specific area (for example, the image area GR2) in the high-resolution mode, since the electronic apparatus 1 returns to the processing in the low-resolution mode by regarding the user as having moved, wasted power consumption and the load on other processing can be reduced.

Second Embodiment

Next, a second embodiment of the present invention will be described.

In the first embodiment, detecting a face area at the high resolution by enlarging the face area when any face area is no longer detected from a captured image or when face detection becomes unstable is described, but the face area may also be detected at the high resolution without enlarging the face area. In this embodiment, the electronic apparatus 1 normally uses a low-resolution image to detect a face area from a captured image, and when any face area is no longer detected from a captured image or when face detection becomes unstable, the electronic apparatus 1 uses a high-resolution image to detect a face area.

In the following, the detection mode to detect a face area using the low-resolution image is called a "low-resolution mode." In the low-resolution mode, the processing load is small and the power consumption is reduced, but a face area difficult to detect such as a side profile may not be able to be detected because the resolution is low. Further, in the following, a detection mode to detect a face area using the high-resolution image is called a "high-resolution mode." Since the high-resolution mode is higher in resolution than the low-resolution mode, a face area may be able to be detected in the high-resolution mode even if the face area cannot be detected in the low-resolution mode.

Note that various methods are considered as the method of acquiring the high-resolution images and the low-resolution images. When the imaging unit 120 capable of outputting both the high-resolution images and the low-resolution images is used, the electronic apparatus 1 can have such a configuration as to instruct the imaging unit 120 to output either of the images depending on the situation. Alternatively, when the imaging unit 120 capable of outputting both the high-resolution images and the low-resolution images at the same time is used, the electronic apparatus 1 can have such a configuration as to select either of the images, output from the imaging unit 120 depending on the situation, as images to be processed depending on the situation. In addition to them, or besides them, the electronic apparatus 1 may have such a configuration as to perform preprocessing to decrease the resolution of image data of images output from the imaging unit 120 to acquire low-resolution images to be processed.

The basic configuration of the electronic apparatus 1 according to the present embodiment is the same as the configuration according to the first embodiment illustrated in FIG. 4 to FIG. 6, and the description thereof will be omitted. In the present embodiment, processing in which the face detection unit 211 switches between the low-resolution mode and the high-resolution mode will be described.

The face detection unit 211 detects a face area from a captured image in the low-resolution mode or the high-resolution mode. As a default setting, the face detection unit 211 sets the detection mode to the low-resolution mode to detect a face area respectively from each of captured images in the low-resolution mode. When any face area is no longer detected from the state where face areas are consecutively detected from the captured images in the low-resolution mode, the face detection unit 211 detects a face area in the high-resolution mode upon detecting the face area from a captured image afterward. Further, when any face area is no longer detected in the high-resolution mode, the face detection unit 211 returns from the high-resolution mode to the low-resolution mode.

Figure 11:
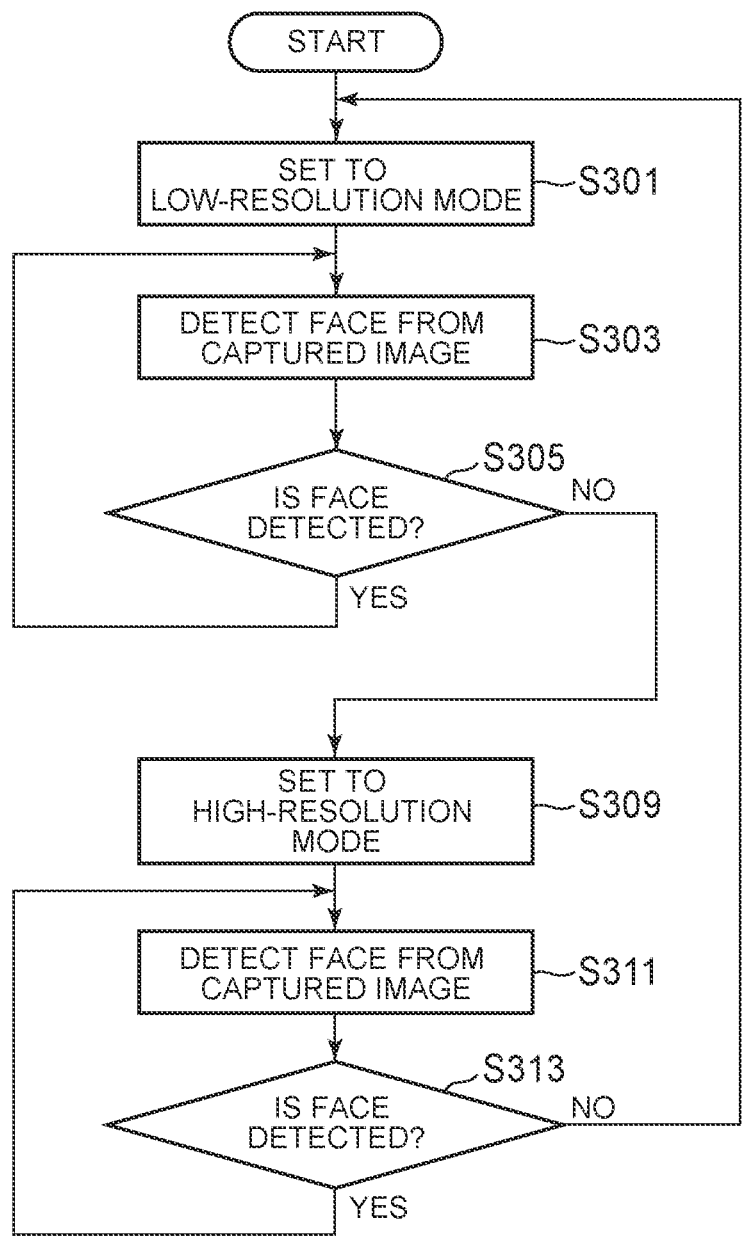
FIG. 11 is a flowchart illustrating a first example of face detection processing according to a second embodiment.

FIG. 11 is a flowchart illustrating a first example of face detection processing according to the present embodiment. Here, the operation of processing to detect a face area by switching from the low-resolution mode to the high-resolution mode using, as a trigger, the fact that any face area is no longer detected from a captured image will be described.

(Step S301) The face detection unit 211 sets the detection mode to the low-resolution mode, and proceeds to a process of step S303.

(Step S303) The face detection unit 211 detects a face area respectively from each of captured images captured by the imaging unit 120 at the predetermined time intervals. For example, the face detection unit 211 detects a face area from a captured image in the n-th frame (n is an integer of 1 or more). Then, the face detection unit 211 proceeds to a process of step S305.

(Step S305) The face detection unit 211 determines whether or not a face area is detected from the captured image in step S303. When determining that the face area is detected from the captured image (YES), the face detection unit 211 stores, as the face detection result history, face detection information including the detected face area and the center coordinates of the face area, and returns to the process of step S303. Then, in step S303, the face detection unit 211 detects a face area in the low-resolution mode from a captured image in the next frame (captured image in the n+1-th frame). On the other hand, when determining in step S305 that any face area is not detected from the captured image (NO), the face detection unit 211 proceeds to a process of step S309.

(Step S309) The face detection unit 211 sets the detection mode to the high-resolution mode, and proceeds to a process of step S311.

(Step S311) In the subsequent frames, the face detection unit 211 detects a face area from a captured image in the high-resolution mode. Then, the face detection unit 211 proceeds to a process of step S313.

(Step S313) The face detection unit 211 determines whether or not the face area is detected from the captured image in step S311. When determining that the face area is detected from the captured image (YES), the face detection unit 211 stores, as the face detection result history, face detection information including the detected face area and the center coordinates of the face area. Then, the face detection unit 211 returns to step S311 to detect a face area in the high-resolution mode from a captured image in the next frame. On the other hand, when determining that any face area is not detected in step S113 (NO), the face detection unit 211 returns to the process of step S301. In other words, when any face area cannot be detected in the high-resolution mode, the face detection unit 211 ends the high-resolution mode and returns to the low-resolution mode.

Figure 12:
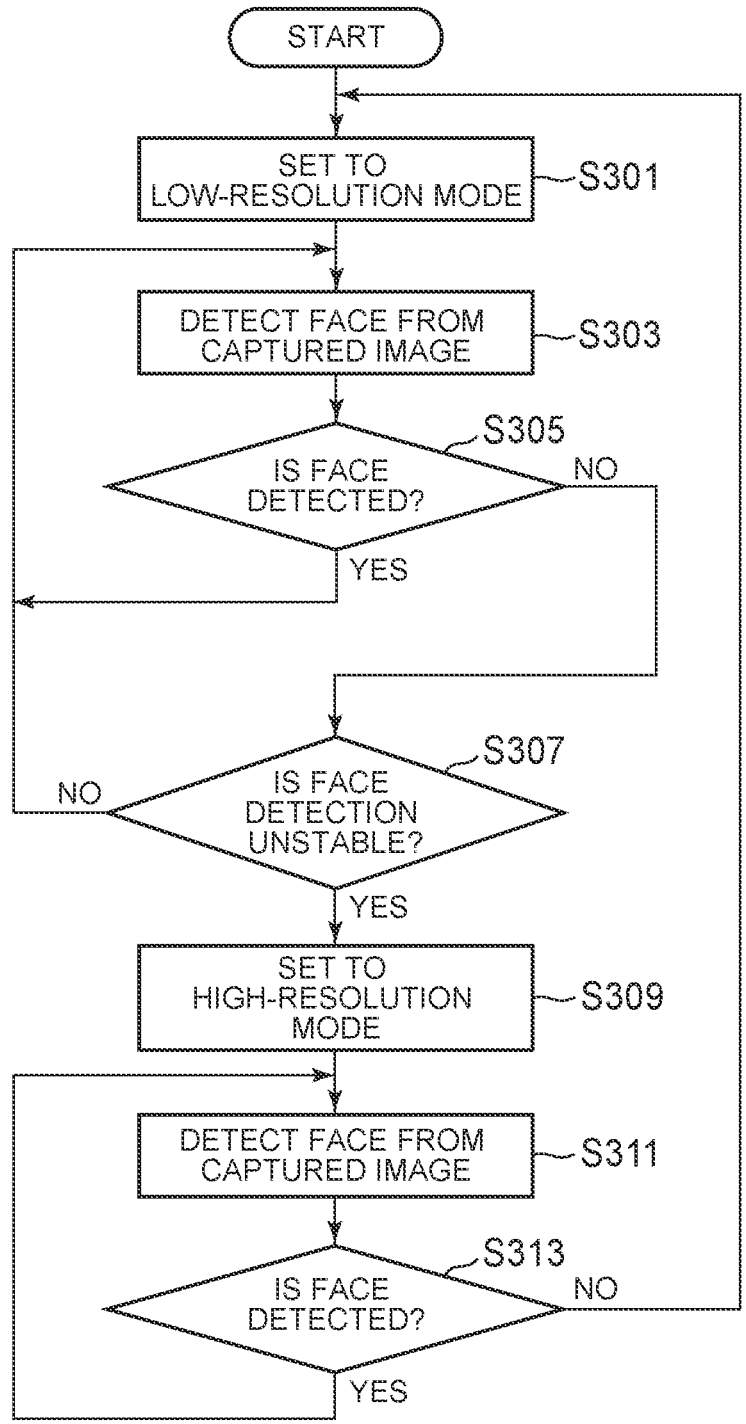
FIG. 12 is a flowchart illustrating a second example of the face detection processing according to the second embodiment.

Referring next to FIG. 12, the operation of processing to detect a face area by switching from the low-resolution mode to the high-resolution mode using, as a trigger, the fact that face detection is unstable will be described.

FIG. 12 is a flowchart illustrating a second example of face detection processing according to the present embodiment. In FIG. 12, the same reference symbol is given to a process corresponding to each process in FIG. 11 to omit the description thereof. In the face detection processing illustrated in FIG. 12, when determining that any face area is not detected from the captured image in step S305 (NO), the procedure proceeds to a process of step S307.

(Step S307) The detection state determination unit 212 determines whether or not face detection is unstable. For example, the detection state determination unit 212 may determine that face detection is unstable based on the fact that any face area is no longer detected from the state where face areas are consecutively detected from captured images. Further, the detection state determination unit 212 may determine that face detection is unstable based on the fact that the images with face areas detected by the face detection unit 211 and the images without detected face areas are both included in the captured images captured at the predetermined time intervals over the predetermined period. In this case, the detection state determination unit 212 may determine that face detection is unstable based on the ratio between the images with face areas detected and the images without detected face areas over the predetermined period, or may determine that face detection is unstable based on the fact that the images with face areas detected and the images without detected face areas are repeated over the predetermined period.

When determining that face detection is unstable (YES), the detection state determination unit 212 proceeds to the process of step S309 to set the detection mode to the high-resolution mode. Then, the face detection unit 211 detects, in the subsequent frames, a face area from a captured image in the high-resolution mode (step S311). On the other hand, when determining in step S307 that face detection is not unstable (NO), the detection state determination unit 212 returns to the process of step S303.

Summary of Second Embodiment

As described above, the electronic apparatus 1 according to the present embodiment detects face areas respectively from captured images in the low-resolution mode as the reduced resolution. Then, when any face area is no longer detected from the state where face areas are consecutively detected from captured images in the low-resolution mode, a face area is detected in the high-resolution mode upon detecting the face area from a captured image afterward.

Thus, since the electronic apparatus 1 can increase the detection rate of even a face difficult to detect such as a side profile, the person (user) using the electronic apparatus 1 can be detected accurately. Further, since the electronic apparatus 1 detects a face area in the high-resolution mode only when any face area is no longer detected from the state where face areas are consecutively detected, increased power consumption and the load on other processing can be reduced.

Further, when determining that face detection is unstable in the low-resolution mode, the electronic apparatus 1 may detect a face area in the high-resolution mode upon detecting the face area from a captured image afterward.

Thus, since the electronic apparatus 1 can increase the detection rate when face detection becomes unstable, the person (user) using the electronic apparatus 1 can be detected accurately. Further, since the electronic apparatus 1 detects a face area in the high-resolution mode only when it is determined that face detection is unstable, increased power consumption and the load on other processing can be reduced.

Further, when any face area cannot be detected from a captured image in the high-resolution mode, the electronic apparatus 1 ends the detection of a face area in the high-resolution mode, and returns to the detection of a face area in the low-resolution mode.

Thus, when any face area cannot be detected even in the high-resolution mode, since the electronic apparatus 1 returns to the low-resolution mode by regarding the person as going away from the front of the electronic apparatus 1, wasted power can be prevented from being consumed and the impact on other processing can be reduced.

Further, the electronic apparatus 1 according to the present embodiment includes the system memory 310 (the example of the memory) for temporarily storing image data of images (captured images) captured by the imaging unit 120 (the example of the imaging device), and the person detection unit 210 (the example of the processor) for processing the image data stored in the system memory 310. The person detection unit 210 processes image data of plural captured images captured by the imaging unit 120 at the predetermined time intervals and stored in the system memory 310 to detect face areas with faces captured therein from among the plural captured images based on first-resolution image data and second-resolution image data. Further, the person detection unit 210 determines whether or not to be a state where face areas are consecutively detected from the plural captured images. Based on the first-resolution image data, when determining that the state is changed between the state where face areas are consecutively detected and a state where face areas are not consecutively detected while performing processing to detect face areas, the person detection unit 210 detects face areas with faces captured therein from among the plural captured images based on the second-resolution image data.

Thus, since the electronic apparatus 1 can increase the detection rate by changing the resolution to detect face areas depending on the detection state of a face, the person (user) using the electronic apparatus 1 can be detected accurately.

For example, the person detection unit 210 determines that the detection state is the state where face areas are not consecutively detected based on the fact that images with face areas detected and images without detected face areas are both included at a predetermined ratio in the plural captured images captured at the predetermined time intervals over the predetermined period.

Thus, since the electronic apparatus 1 can increase the detection rate by changing the resolution to detect a face even when the face is difficult to detect such as a side profile and hence face detection becomes unstable, the person (user) using the electronic apparatus 1 can be detected accurately.

Further, the above first resolution is a low resolution lower than the above second resolution. Based on the first-resolution image data, when determining that the state is changed from the state where face areas are consecutively detected to the state where face areas are not consecutively detected while executing processing to detect the face areas in the low-resolution mode, the person detection unit 210 executes processing in the high-resolution mode to detect a face area based on the second-resolution image data in a specific area (for example, the image area GR2) corresponding to the position of a face area detected in the processing of the low-resolution mode.

Thus, since the electronic apparatus 1 can increase the detection rate by detecting the face area in the high-resolution mode when the face is a face difficult to detect such as a side profile and hence face detection becomes unstable, the person (user) using the electronic apparatus 1 can be detected accurately. Further, since the electronic apparatus 1 detects the face area in the high-resolution mode only when face detection becomes unstable, increased power consumption and the load on other processing can be reduced.

Further, when any face area cannot be detected from the specific area (for example, the image area GR2) in the high-resolution mode, the person detection unit 210 executes the detection of a face area in the low-resolution mode.

Thus, when any face area cannot be detected from the specific area (for example, the image area GR2) in the high-resolution mode, since the electronic apparatus 1 returns to the processing in the low-resolution mode by regarding the user as having moved, wasted power consumption and the load on other processing can be reduced.

Third Embodiment

Next, a third embodiment of the present invention will be described.

It is desired that the detection range DR when a face area is detected from a captured image should be set as small as possible from the perspective of reducing power consumption. For example, as illustrated in FIG. 3, the detection range DR of face detection is set to a range smaller than the range of the image area GR1 of the captured image. However, when the detection range DR is set to a small range, the user present in front of the electronic apparatus 1 may not be able to be detected depending on the position of the user.

Figure 13:
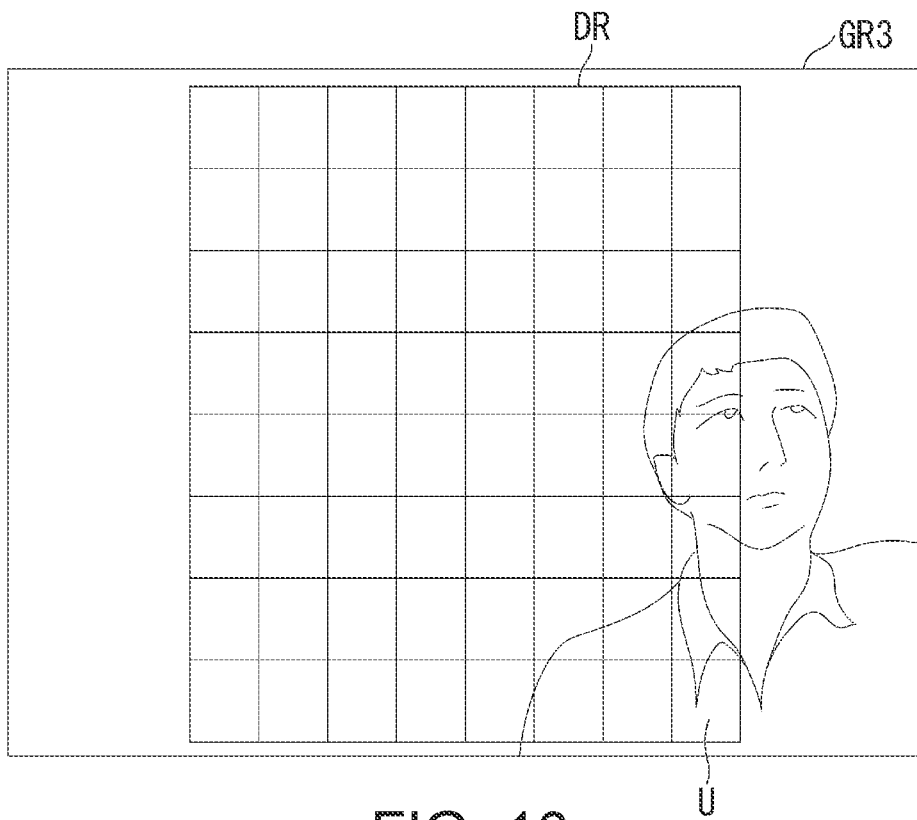
FIG. 13 is a diagram illustrating an example of a positional relationship between a detection range DR and a user.

FIG. 13 is a diagram illustrating an example of a positional relationship between the detection range DR and the user. As illustrated, when the position of a user U moves toward an edge (for example, the right edge) of an image area GR3 of a captured image, only part of the face of the user U may fall within the detection range DR. In such a case, a face area may not be detected and hence the presence of the user may not be able to be detected correctly. Therefore, in this embodiment, the electronic apparatus 1 moves the detection range DR according to the position of the detected face area.

Figure 14:
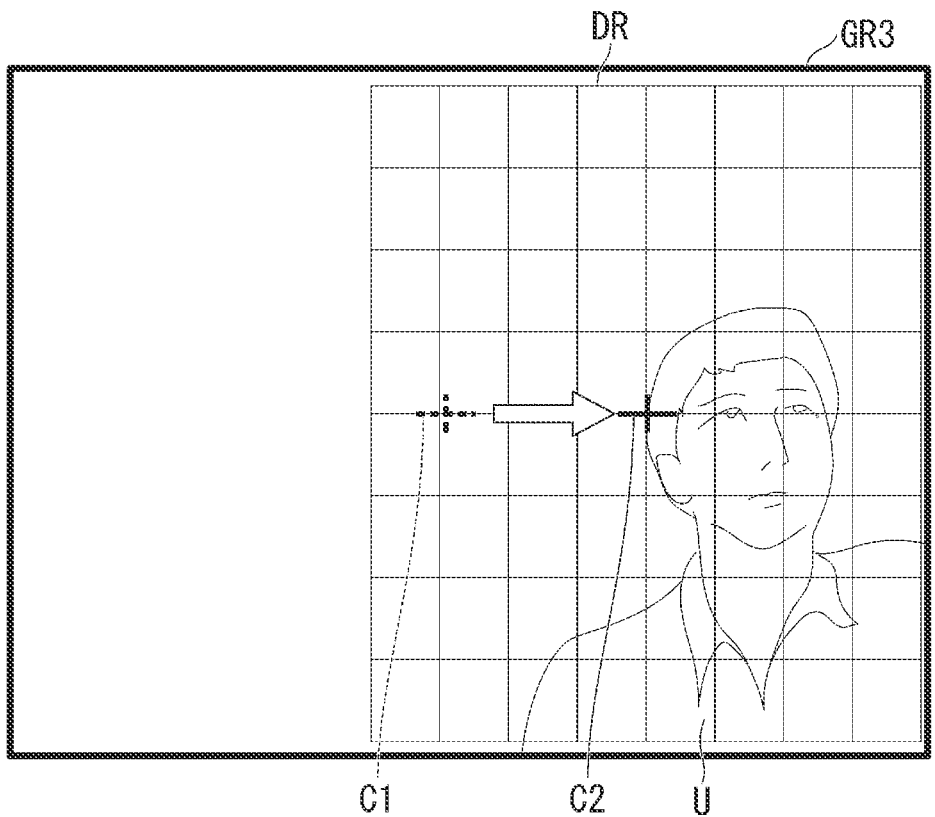
FIG. 14 is a diagram for describing the movement of a detection range according to a third embodiment.

FIG. 14 is a diagram for describing the movement of the detection range DR according to the present embodiment. As illustrated, when the user U has moved to the right side of the image area GR3, the detection range DR is also moved in the right direction according to the movement of the user U. Reference symbol C1 indicates the center position of the detection range DR when the detection range DR is set in the center of the image area GR3 (see FIG. 13). Reference symbol C2 indicates the center position of the detection range DR after being moved. Thus, the electronic apparatus 1 can detect the presence of the user correctly by tracking the detection range DR according to the position (movement) of the face area.

Note that the movement of the detection range DR is limited until the left side of the detection range DR reaches the left side of the image area GR3 or the right side of the detection range DR reaches the right side of the image area GR3. Although an example in which the detection range DR illustrated in FIG. 13 and FIG. 14 can be moved only in the left-right direction is illustrated, the detection range DR may also be movable in the up-down direction by setting the upper and lower sides of the detection range DR to a shorter range than the upper and lower sides of the image area GR3. Even when the detection range DR is moved in the up-down direction, the movement of the detection range DR is limited until the upper side of the detection range DR reaches the upper side of the image area GR3 or the lower side of the detection range DR reaches the lower side of the image area GR3.

The basic configuration of the electronic apparatus 1 according to the present embodiment is the same as the configuration according to the first embodiment illustrated in FIG. 4 and FIG. 5, and the description thereof will be omitted.

Figure 15:
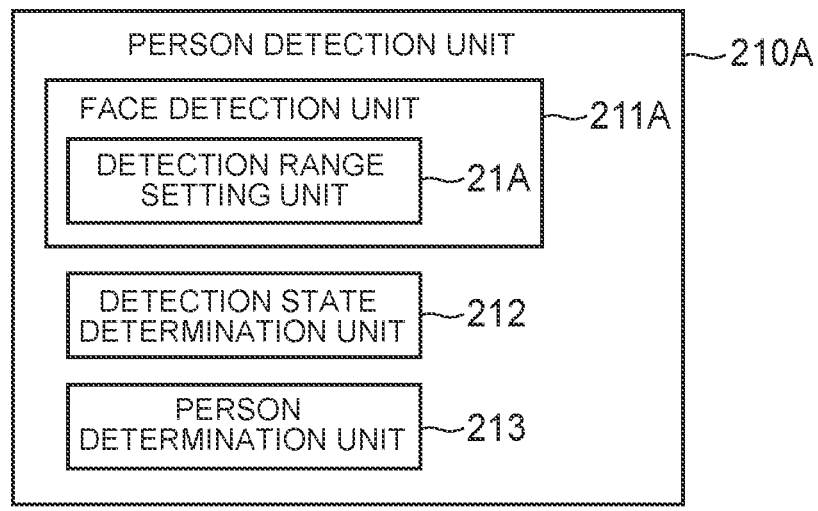
FIG. 15 is a diagram illustrating an example of the configuration of a person detection unit according to the third embodiment.

FIG. 15 is a diagram illustrating an example of the configuration of a person detection unit 210A according to the present embodiment. The person detection unit 210A illustrated is a component of the present embodiment corresponding to the person detection unit 210 illustrated in FIG. 5. In FIG. 15, each unit corresponding to each unit of FIG. 6 is given the same reference numeral to omit the description thereof. The person detection unit 210A includes a face detection unit 211A, the detection state determination unit 212, and the person determination unit 213. The person detection unit 210A is different from the person detection unit 210 illustrated in FIG. 6 in that the face detection unit 211A includes a detection range setting unit 21A. As described with reference to FIG. 14, the detection range setting unit 21A moves the detection range DR according to the position of the detected face area. The face detection unit 211A detects a face area in a detection range DR set by the detection range setting unit 21A.

For example, in the initial state, the detection range setting unit 21A sets the detection range DR to make the center position of the detection range DR correspond to the center position of the image area GR3 (initial position). Further, when no face area is detected in the initial state, the detection range setting unit 21A may also move the detection range DR in such a way as to search the full range of the image area GR3. Further, when the face area is no longer detected after the detection range DR is moved according to the position of the detected face area, the detection range setting unit 21A may return the detection range DR to the position in the initial state.

Figure 16:
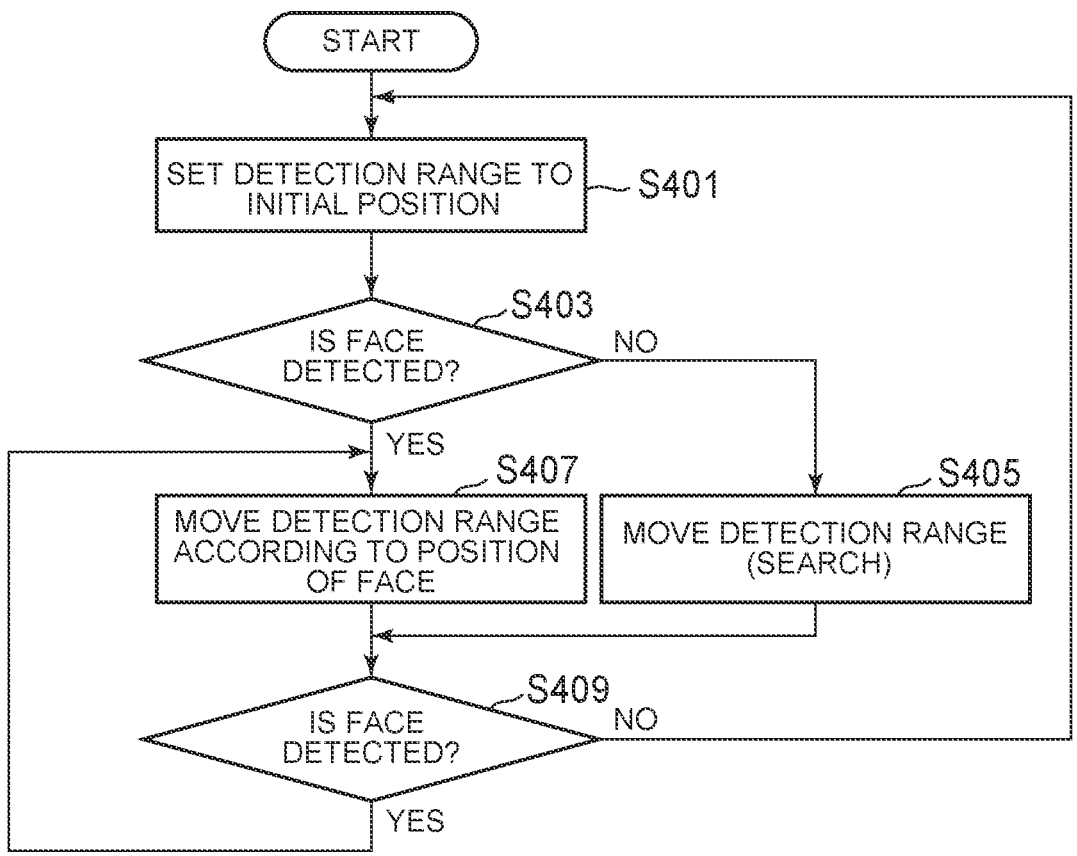
FIG. 16 is a flowchart illustrating an example of detection range control processing according to the third embodiment.

Referring next to FIG. 16, the operation of detection range control processing in which the detection range setting unit 21A controls the setting and movement of the detection range DR will be described.

FIG. 16 is a flowchart illustrating an example of detection range control processing according to the present embodiment.

(Step S401) The detection range setting unit 21A first sets the detection range DR to an initial position. For example, the detection range setting unit 21A sets the detection range DR to locate the center of the detection range DR in the center position of the image area GR3 as the initial position. Then, the detection range setting unit 21A proceeds to a process of step S403.

(Step S403) The detection range setting unit 21A determines whether or not a face area is detected by the face detection unit 211A. When determining that any face area is not detected by the face detection unit 211A (NO), the detection range setting unit 21A proceeds to a process of step S405.

(Step S405) The detection range setting unit 21A moves the detection range DR in such a way as to search the full range of the image area GR3. Then, the detection range setting unit 21A proceeds to a process of step S409.

On the other hand, when determining in step S403 that a face area is detected by the face detection unit 211A (YES), the detection range setting unit 21A proceeds to a process of step S407.

(Step S407) The detection range setting unit 21A moves the detection range DR according to the position of the detected face area (see FIG. 14). Then, the detection range setting unit 21A proceeds to the process of step S409.

(Step S409) The detection range setting unit 21A determines whether or not a face area is detected by the face detection unit 211A. When determining that the face area is detected by the face detection unit 211A (YES), the detection range setting unit 21A returns to the process of step S407 to move the detection range DR according to the position of the detected face area. On the other hand, when determining that any face area is not detected by the face detection unit 211A (NO), the detection range setting unit 21A returns to the process of step S401 to set the detection range DR to the initial position.

Summary of Third Embodiment

As described above, the detection range DR when a face area is detected from a captured image is set to a range smaller than the image area GR3 of the captured image. Then, the electronic apparatus 1 moves the detection range DR according to the position of the detected face area.

Thus, the electronic apparatus 1 can detect the person (user) using the electronic apparatus 1 accurately while reducing power consumption.

Further, in the initial state, the electronic apparatus 1 sets the detection range DR to make the center position of the detection range DR correspond to the center position of the image area GR3 of the captured image.

Thus, since the electronic apparatus 1 sets the detection range DR in such a way that the center position of the image area GR3 in which the user is likely to be present is included in the detection range in the initial state, the person (user) using the electronic apparatus can be detected accurately.

Fourth Embodiment

Next, a fourth embodiment of the present invention will be described.

A person other than the user may get closer to or pass by the front of the electronic apparatus 1. In such a case, for example, there is no need to boot the electronic apparatus 1

(or it is better not to boot the electronic apparatus 1). Therefore, in this embodiment, even when a face area of a person other than the user is detected, the detection of the face area is ignored.

Figure 17:
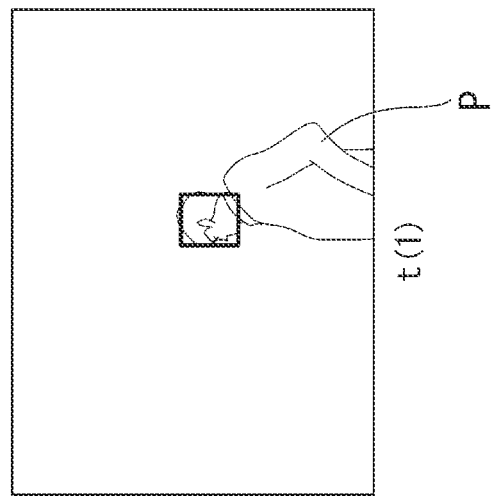
FIG. 17 is a diagram illustrating an example of any person other than a user.
Figure 17:
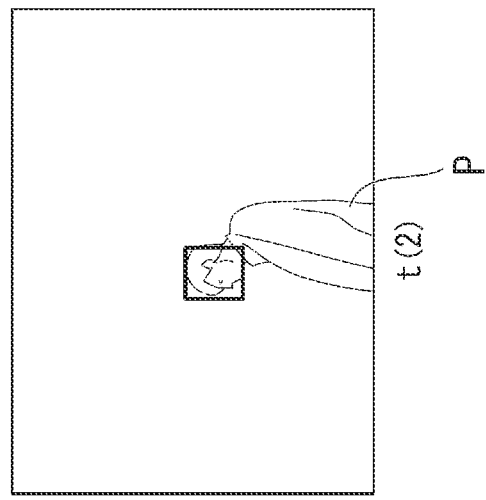
Figure 17:
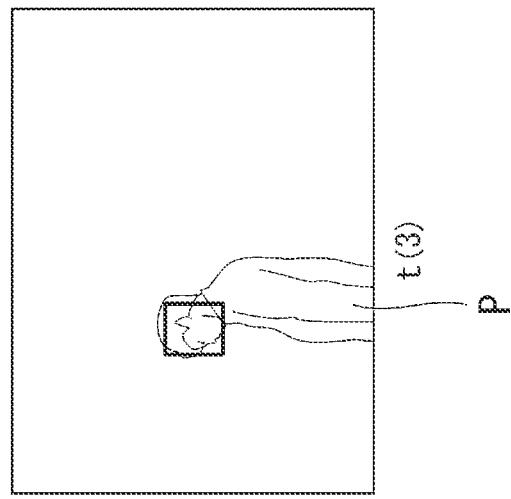

FIG. 17 is a diagram illustrating an example of face detection of a person other than the user. In the illustrated example, captured images captured by the electronic apparatus 1 at predetermined time intervals are illustrated in chronological order from time t(1) to time t(3). Here, the captured images are an example of captured images captured at respective times when a person P other than the user passes by the front of the electronic apparatus 1 from right to left. The amount of movement in the position of a face area detected in each captured image is larger than that when the user is sitting in front of the electronic apparatus 1. Therefore, when the amount of movement in the detected face area is a predetermined threshold value or more, the electronic apparatus 1 according to the present embodiment ignores the detection of the face area. Note that the person other than the user is a person who is not using the electronic apparatus 1 at the time, which does not mean that the person is a person other than the owner of the electronic apparatus 1.

The basic configuration of the electronic apparatus 1 according to the present embodiment is the same as the configuration according to the first embodiment illustrated in FIG. 4 and FIG. 5, and the description thereof will be omitted.

Figure 18:
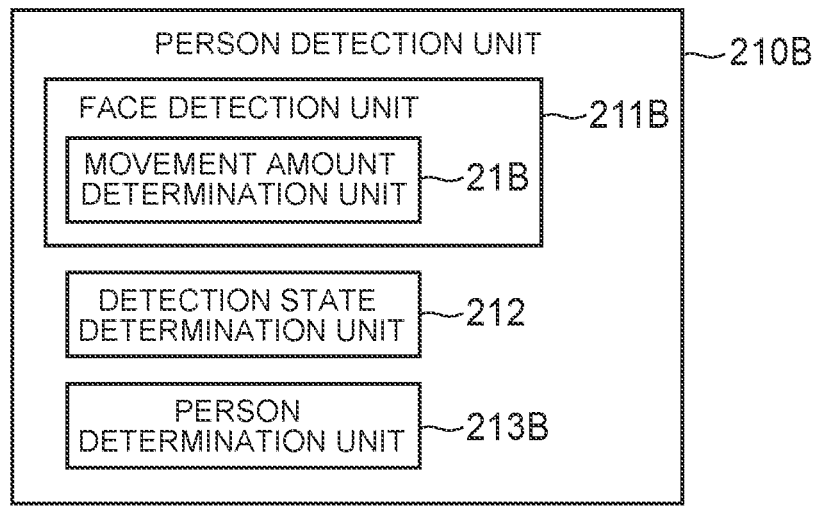
FIG. 18 is a diagram illustrating an example of the configuration of a person detection unit according to a fourth embodiment.

FIG. 18 is a diagram illustrating an example of the configuration of a person detection unit 210B according to the present embodiment. The person detection unit 210B illustrated is a component of the present embodiment corresponding to the person detection unit 210 illustrated in FIG. 5. In FIG. 18, each unit corresponding to each unit of FIG. 6 is given the same reference numeral to omit the description thereof. The person detection unit 210B includes a face detection unit 211B, the detection state determination unit 212, and a person determination unit 213B (an example of a determination unit). The face detection unit 211B includes a movement amount determination unit 21B.

Based on the position of a face area detected by the face detection unit 211B from each of captured images captured at predetermined time intervals, the movement amount determination unit 21B determines whether or not the amount of movement of the face area is a predetermined threshold value or more. When it is determined by the movement amount determination unit 21B that the amount of movement of the face area is the predetermined threshold value or more, the face detection unit 211B disables the detection of the face area. On the other hand, when it is determined by the movement amount determination unit 21B that the amount of movement of the face area is less than the predetermined threshold value, the face detection unit 211B enables the detection of the face area. The predetermined threshold value is, for example, a threshold value preset based on the amount of movement of a face area expected while the user is using the electronic apparatus 1. As an example, the amount of movement within the size of one face in the up/down/left/right directions may be set as the predetermined threshold value.

Even when the amount of movement of the face area is small, if there is movement in the electronic apparatus 1 itself, the amount of movement of the detected face area will become large. Therefore, the movement amount determination unit 21B may determine the amount of movement of the face area detected by the face detection unit 211B in consideration of the movement of the electronic apparatus 1 detected by the acceleration sensor 130. In other words, when the electronic apparatus 1 has moved, the movement amount determination unit 21B may correct the amount of movement of the face area detected from a captured image based on the moving direction and the amount of movement of the electronic apparatus 1, and determine whether or not the corrected value is the predetermined threshold value or more.

Figure 19:
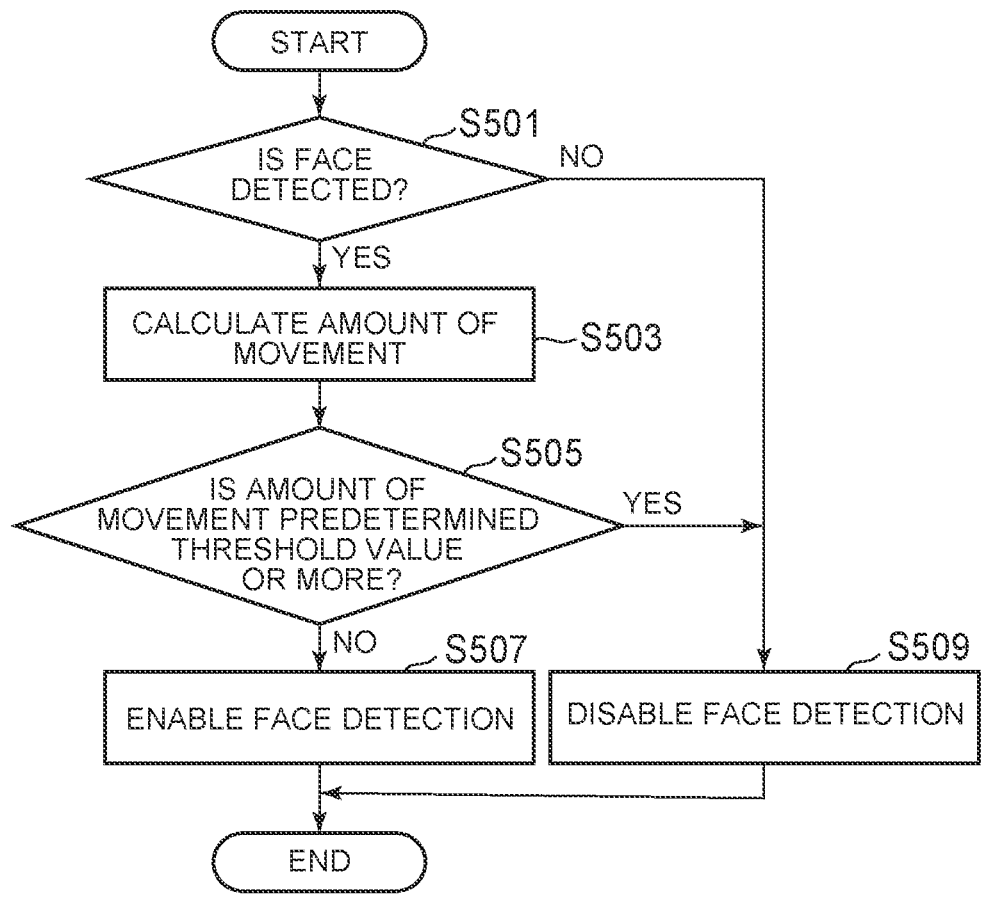
FIG. 19 is a flowchart illustrating an example of person detection processing according to the fourth embodiment.

Referring next to FIG. 19, the operation of face detection processing by the face detection unit 211B will be described.

FIG. 19 is a flowchart illustrating an example of face detection processing according to the present embodiment.

(Step S501) The face detection unit 211B determines whether or not a face area is detected. When determining that a face area is detected (YES), the face detection unit 211B proceeds to a process of step S503. On the other hand, when determining that any face area is not detected (NO), the face detection unit 211B proceeds to a process of step S509.

(Step S503) Based on the position of the face area detected respectively from each of captured images captured at the predetermined time intervals, the face detection unit 211B calculates the amount of movement of the face area, and proceeds to a process of step S505.

(Step S505) Based on the position of the face area detected from each of captured images captured at the predetermined time intervals, the face detection unit 211B determines whether or not the amount of movement of the face area is the predetermined threshold value or more. When determining that the amount of movement of the face area is less than the predetermined threshold value (NO), the face detection unit 211B proceeds to a process of step S507. On the other hand, when determining that the amount of movement of the face area is the predetermined threshold value or more (YES), the face detection unit 211B proceeds to a process of step S509.

(Step S507) The face detection unit 211B enables the detection of the face area detected from the captured image.

(Step S509) The face detection unit 211B disables the detection of the face area detected from the captured image.

Based on the detection result of the face area by the face detection processing described above, the person determination unit 213B determines whether or not a person is present in front of the electronic apparatus 1. For example, when the detection of the face area detected from the captured image is enabled by the face detection unit 211B, the person determination unit 213B determines that a person is present in front of the electronic apparatus 1. On the other hand, when any face area is not detected from the captured image or the detection of the face area detected from the captured image is disabled by the face detection unit 211B, the person determination unit 213B determines that no person is present in front of the electronic apparatus 1.

Thus, even when the face area is detected from the captured image, if the amount of movement of the face area is the predetermined threshold value or more, the person detection unit 210B will disable the face detection by regarding the face as the face of a person other than the user, and determine that the user is absent. Thus, since the electronic apparatus 1 does not detect that the user approaches even when a person other than the user gets closer to or passes by the front of the electronic apparatus 1, the electronic apparatus 1 can be prevented from being booted by mistake.

Summary of Fourth Embodiment

As described above, based on the position of a face area detected from each of plural captured images captured at the predetermined time intervals, the electronic apparatus 1 according to the present embodiment determines whether or not the amount of movement of the face area is the predetermined threshold value or more. When determining that the amount of movement of the face area is the predetermined threshold value or more, the electronic apparatus 1 disables the detection of the face area, while when the amount of movement of the face area is less than the predetermined threshold value, the electronic apparatus 1 enables the detection of the face area.

Thus, when a person other than the user gets closer to or passes by the front of the electronic apparatus 1, the electronic apparatus 1 can prevent the approach of the user from being erroneously detected. Therefore, the electronic apparatus 1 can detect the person (user) using the electronic apparatus 1 accurately.

Further, the electronic apparatus 1 includes the acceleration sensor 130 (an example of a sensor) to detect the movement of the electronic apparatus 1, and determines the amount of movement of the detected face area in consideration of the movement of the electronic apparatus 1 detected by the acceleration sensor 130.

Thus, even when the electronic apparatus 1 itself is moved, since the electronic apparatus 1 can detect the amount of movement of the face area correctly, the person (user) using the electronic apparatus 1 can be detected accurately.

Further, the electronic apparatus 1 includes the system processing unit 300 (an example of a processing unit) which executes system processing based on the system. Further, when the detection of a face area detected from a captured image is enabled, the electronic apparatus 1 determines that the user is present, while when any face area is not detected from the captured image or when the detection of the face area detected from the captured image is disabled, the electronic apparatus 1 determines that the user is absent. Then, when the transition from the state where the user is absent to the state where the user is present is made, the electronic apparatus 1 causes the operating state of the system to make the transition from the standby state (an example of a first operating state) to the normal operating state (an example of a second operating state).

Thus, the electronic apparatus 1 can be booted from the standby state when the person (user) using the electronic apparatus 1 gets closer to the front of the electronic apparatus 1, and can be prevented from being booted by mistake even when a person other than the user gets closer to or passes by the front of the electronic apparatus 1.

Further, a control method for the electronic apparatus 1 according to the present embodiment includes: a step of detecting a face area respectively from each of captured images captured at predetermined time intervals; and a step of determining whether or not the amount of movement of the face area is a predetermined threshold value or more based on the position of the face area detected from each of the captured images; and a step in which, when it is determined that the amount of movement of the face is the predetermined threshold value or more, the detection of the face area is disabled, while when it is determined that the amount of movement of the face is less than the predetermined threshold value, the detection of the face area is enabled.

Thus, even when a person other than the user gets closer to or passes by the front of the electronic apparatus 1, the electronic apparatus 1 can prevent the approach of the user from being erroneously detected. Therefore, the electronic apparatus 1 can accurately detect the person (user) using the electronic apparatus 1.

While the respective embodiments of this invention have been described in detail above with reference to the accompanying drawings, the specific configurations are not limited to the above-described embodiments, and design changes are included without departing from the scope of this invention. For example, the respective configurations described in the respective embodiments described above can be combined arbitrarily.

Further, in the aforementioned embodiments, the configuration example in which the imaging unit 120 is built in the electronic apparatus 1 is described, but the present invention is not limited to this example. For example, the imaging unit 120 does not have to be built in the electronic apparatus 1, which may also be attachable to the electronic apparatus 1 (for example, onto any of the side faces 10*a*, 10*b*, 10*c*, and the like) and communicably connected to the electronic apparatus 1 wirelessly or by wire as an external accessory.

Further, in the aforementioned embodiments, the electronic apparatus 1 detects face areas with a face captured therein from captured images to detect the presence of the user, but the detection areas are not limited to the face areas, and the presence of the user may also be detected by detecting areas in which at least part of the body is captured. Further, the electronic apparatus 1 may use a distance sensor (for example, a proximity sensor or the like) together to detect distance to an object. For example, the distance sensor is provided on the inner face side of the first chassis 10 to detect an object (for example, a person) present within a detection range in a direction (forward) to face the inner face of the first chassis 10. As an example, the distance sensor may be an infrared distance sensor configured to include a light-emitting part for emitting infrared light and a light-receiving part for receiving reflected light which is the infrared light returned after being emitted and reflected on the surface of the object. Note that the distance sensor may be a sensor using infrared light emitted by a light-emitting diode, or a sensor using infrared laser emitting a light beam narrower in wavelength band than the infrared light emitted by the light-emitting diode. Further, the distance sensor is not limited to the infrared distance sensor, and it may be a sensor using any other method, such as an ultrasonic sensor or a sensor using an UWB (Ultra Wide Band) radar, as long as the sensor detects distance to the object. Further, the distance sensor does not have to be built in the electronic apparatus 1, which may also be attachable to the electronic apparatus 1 (for example, onto any of the side faces 10*a*, 10*b*, 10*c*, and the like) and communicably connected to the electronic apparatus 1 wirelessly or by wire as an external accessory. Further, the imaging unit 120 and the distance sensor may be integrally constructed.

Further, in the aforementioned embodiments, the example in which the person detection unit 210 is provided separately from the EC 200 is illustrated, but some or all of the functions of the person detection unit 210 may be provided in the EC 200. Further, in the aforementioned embodiments, the example in which the EC 200 includes the operation control unit 220 is illustrated, but some or all of the functions of the operation control unit 220 may be provided in any processing unit (for example, the system processing unit 300) other than the EC 200.

Further, in the aforementioned embodiments, the EC 200 operating independently of the system processing unit 300 may be any processing unit such as a sensor hub or a chipset, and the above-described processing may be executed by any processing unit other than the EC 200 instead of the EC 200.

Further, the standby state described above may also include a hibernation state, a power-off state, or the like. The hibernation state corresponds, for example, to S4 state defined in the ACPI specification. The power-off state corresponds, for example, to S5 state (shutdown state) defined in the ACPI specification. The standby state may further include a state in which at least the display of the display unit appears to be OFF (screen OFF) or a screen lock state. The screen lock is a state in which an image preset to make a processed content invisible (for example, an image for the screen lock) is displayed on the display unit, that is, an unusable state until the lock is released (for example, user authentication).

Note that the electronic apparatus 1 described above has a computer system therein. Then, a program for implementing the function of each component included in the electronic apparatus 1 described above may be recorded on a computer-readable recording medium so that the program recorded on this recording medium is read into the computer system and executed to perform processing in each component included in the electronic apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the electronic apparatus 1, or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the electronic apparatus 1 in the above-described embodiments may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the electronic apparatus 1 in the above-described embodiments is not limited to a PC, a tablet terminal, or a smartphone, and the present invention can also be applied to a household electric appliance or a commercial electric appliance. As the household electric appliance, the present invention can be applied to a TV set, a refrigerator or a microwave oven having a display unit, or the like. For example, ON/OFF of a TV screen or ON/OFF of a screen of the display unit of the refrigerator or the microwave oven can be controlled in response to the approach or leave of a person. As the commercial electric appliance, the present invention can be applied to a vending machine, a multimedia station, or the like. For example, an operating state such as ON/OFF of lighting of the vending machine or ON/OFF of a screen of a display unit of the multimedia station can be controlled in response to the approach or leave of a person.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

1 electronic apparatus
10 first chassis
20 second chassis
15 hinge mechanism
110 display unit
120 imaging unit
130 acceleration sensor
140 power button
150 input device
151 keyboard
153 touch pad
200 EC,
210, 210A, 210B person detection unit
211, 211A, 211B face detection unit
21A detection range setting unit
21B movement amount determination unit
212 detection state determination unit
213, 213B person determination unit
220 operation control unit
300 system processing unit
302 CPU
304 GPU
306 memory controller
308 I/O controller
310 system memory
350 communication unit
360 storage unit
400 power supply unit

The invention claimed is:
1. An electronic apparatus comprising:
a memory which temporarily stores image data of an image captured by an imaging device; and
a processor which processes the image data stored in the memory,
the processor comprising:
a face detection unit which processes image data of a plurality of images captured by the imaging device at predetermined time intervals and stored in the memory to detect face areas with faces captured therein from among the plurality of images based on first-resolution image data and second-resolution image data;
a detection state determination unit which determines whether or not the face areas are consecutively detected from the plurality of images; and
a movement amount determination unit which determines whether or not an amount of movement of each of the face areas is a predetermined threshold value or more based on a position of the face area detected by the face detection unit from each of the plurality of images,
wherein when the detection state determination unit determines, based on the first-resolution image data, that a state is changed between a state where the face areas are consecutively detected and a state where the face areas are not consecutively detected while performing processing to detect the face areas, the face detection unit detects the face areas from the plurality of images based on the second-resolution image data, and
wherein when the movement amount determination unit determines that the amount of movement of the face area is the predetermined threshold value or more, the face detection unit disables detection of the face area, while when the movement amount determination unit determines that the amount of movement of the face area is less than the predetermined threshold value, the face detection unit enables the detection of the face area.

2. The electronic apparatus according to claim 1, wherein the detection state determination unit determines that the state is the state where the face areas are not consecutively detected based on a fact that images with face areas detected by the face detection unit and images without detected face areas are both included at a predetermined ratio in the plurality of images captured at the predetermined time intervals over a predetermined period.

3. The electronic apparatus according to claim 1, wherein
a first resolution, of the first-resolution image data, is a resolution that is lower than a second resolution, of the second-resolution image data, and
when the detection state determination unit determines that the state is changed from the state where the face areas are consecutively detected to the state where the face areas are not consecutively detected while performing processing to detect the face areas in a low-resolution mode based on the first-resolution image data, the face detection unit executes processing in a high-resolution mode to perform detection of the face areas based on the second-resolution image data in specific areas corresponding to positions of the face areas detected in the processing of the low-resolution mode.

4. The electronic apparatus according to claim 3, wherein when the face areas cannot be detected from the specific areas in the high-resolution mode, the face detection unit executes the detection of the face areas in the low-resolution mode.

5. The electronic apparatus according to claim 1, wherein
a detection range when the face detection unit detects the face areas from the plurality of images is set to a range smaller than a range of image areas of the captured images, and
the electronic apparatus further comprises a detection range setting unit which moves the detection range according to positions of the face areas detected by the face detection unit.

6. The electronic apparatus according to claim 5, wherein the detection range setting unit sets the detection range to make a center position of the detection range correspond to a center position of each of the image areas of the captured images in an initial state.

7. An electronic apparatus comprising:
a memory which temporarily stores image data of an image captured by an imaging device; and
a processor which processes the image data stored in the memory,
the processor including:
a face detection unit which processes image data of a plurality of images captured by the imaging device at predetermined time intervals and stored in the memory to detect a face area with a face captured therein from among the plurality of images; and
a movement amount determination unit which determines whether or not an amount of movement of the face area is a predetermined threshold value or more based on a position of the face area detected by the face detection unit from among the plurality of images,
wherein when the movement amount determination unit determines that the amount of movement of the face area is the predetermined threshold value or more, the face detection unit disables detection of the face area, while when the movement amount determination unit determines that the amount of movement of the face area is less than the predetermined threshold value, the face detection unit enables the detection of the face area.

8. The electronic apparatus according to claim 1, further comprising
a sensor which detects movement of the electronic apparatus,
wherein the movement amount determination unit determines the amount of movement of the face area detected by the face detection unit in consideration of the movement of the electronic apparatus detected by the sensor.

9. The electronic apparatus according to claim 1, further comprising:
a processing unit which executes system processing based on a system;
a person determination unit which determines that a user is present when the detection of the face area detected by the face detection unit is enabled, and determines that the user is absent when the face area is not detected by the face detection unit or when the detection of the face area detected by the face detection unit is disabled; and
an operation control unit which causes an operating state of the system to make a transition from a first operating state in which at least part of the system processing is limited to a second operating state in which operation of the system processing is more activated than the first operating state when a determination result of the person determination unit is that a transition from a state where the user is absent to a state where the user is present is made.

10. A control method for an electronic apparatus including a memory which temporarily stores image data of an image captured by an imaging device, and a processor which processes the image data stored in the memory, the control method comprising:
a step of causing a face detection unit to process image data of a plurality of images captured by the imaging device at predetermined time intervals and stored in the memory to detect face areas with faces captured therein from among the plurality of images based on first-resolution image data and second-resolution image data;

a step of causing a detection state determination unit to determine whether or not the face areas are consecutively detected from the plurality of images; and a step of causing a movement amount determination unit to determine whether or not an amount of movement of each of the face areas is a predetermined threshold value or more based on a position of the face area detected by the face detection unit from each of the plurality of images, wherein in the step of causing the face detection unit to detect the face areas, when the detection state determination unit determines that a state is changed between a state where the face areas are consecutively detected and a state where the face areas are not consecutively detected while performing processing to detect the face areas based on the first-resolution image data, the face detection unit detects the face areas from the plurality of images based on the second-resolution image data, and wherein when the movement amount determination unit determines that the amount of movement of the face area is the predetermined threshold value or more, the face detection unit disables detection of the face area, while when the movement amount determination unit determines that the amount of movement of the face area is less than the predetermined threshold value, the face detection unit enables the detection of the face area.

11. A control method for an electronic apparatus including a memory which temporarily stores image data of an image captured by an imaging device, and a processor which processes the image data stored in the memory, the control method comprising:

a step of causing a face detection unit to process image data of a plurality of images captured by the imaging device at predetermined time intervals and stored in the memory to detect face areas with faces captured therein from among the plurality of images based on first-resolution image data and second-resolution image data; and a step of causing a movement amount determination unit to determine whether or not an amount of movement of each of the face areas is a predetermined threshold value or more based on a position of the face area detected by the face detection unit from each of the plurality of images, wherein when the movement amount determination unit determines that the amount of movement of the face area is the predetermined threshold value or more, the face detection unit disables detection of the face area, while when the movement amount determination unit determines that the amount of movement of the face area is less than the predetermined threshold value, the face detection unit enables the detection of the face area.

* * * * *